United States Patent
Stilborn et al.

(10) Patent No.: US 11,319,193 B2
(45) Date of Patent: May 3, 2022

(54) MONITORING SYSTEM AND METHOD

(71) Applicant: Brandt Industries Canada Ltd., Regina (CA)

(72) Inventors: Mitch Stilborn, Regina (CA); Chris Semple, Regina (CA)

(73) Assignee: Brandt Industries Canada Ltd., Regina (CA)

( * ) Notice: Subject to any disclaimer, the term of this patent is extended or adjusted under 35 U.S.C. 154(b) by 0 days.

(21) Appl. No.: 16/047,525

(22) Filed: Jul. 27, 2018

(65) Prior Publication Data

US 2019/0031474 A1 Jan. 31, 2019

Related U.S. Application Data

(63) Continuation-in-part of application No. 15/815,892, filed on Nov. 17, 2017, now Pat. No. 10,782,202.
(Continued)

(30) Foreign Application Priority Data

Jul. 28, 2017 (CA) ................................ CA 2974819
Oct. 26, 2017 (CA) ................................ CA 2983837

(51) Int. Cl.
*B66C 13/16* (2006.01)
*B66C 23/90* (2006.01)
(Continued)

(52) U.S. Cl.
CPC .............. *B66C 13/16* (2013.01); *B66C 13/18* (2013.01); *B66C 13/50* (2013.01); *B66C 15/00* (2013.01);
(Continued)

(58) Field of Classification Search
CPC ......... B66C 13/16; B66C 13/18; B66C 13/50; B66C 15/00; B66C 15/065; B66C 23/00; B66C 23/44; B66C 23/905
See application file for complete search history.

(56) References Cited

U.S. PATENT DOCUMENTS 3,534,355 A 10/1970 Fathauer
3,641,551 A 2/1972 Sterner et al.
(Continued)

OTHER PUBLICATIONS

Fitzpatrick, Richard. "8.4: Weight and pulley", 2006. http://farside.ph.utexas.edu/teaching/301/lectures/node112.html (Year: 2006).*
(Continued)

*Primary Examiner* — Alan D Hutchinson
(74) *Attorney, Agent, or Firm* — Frost Brown Todd LLC; Nicole M. Tepe

(57) ABSTRACT

A hoist lifting system having planning and monitoring of components. The system monitors one or more components and may have a processing structure and memory storing instructions to configure the processing structure to: receive hoist machine data; determine a rotation speed of a bearing, a travel speed of a rope, a load on the bearing, a friction in the at least one bearing based on the hoist machine data; and store the rotation speed, the travel speed, the load, and the friction in a maintenance database in memory. The hoist lifting system may have the processing structure determine a wear of one or more components.

31 Claims, 15 Drawing Sheets

Related U.S. Application Data

(60) Provisional application No. 62/631,059, filed on Feb. 15, 2018, provisional application No. 62/538,966, filed on Jul. 31, 2017.

(51) Int. Cl.

| | | |
|---|---|---|
| *B66C 13/18* | (2006.01) | |
| *B66D 1/56* | (2006.01) | |
| *B66D 1/58* | (2006.01) | |
| *B66C 15/00* | (2006.01) | |
| *B66C 15/06* | (2006.01) | |
| *B66D 1/48* | (2006.01) | |
| *G01L 5/00* | (2006.01) | |
| *G01M 13/04* | (2019.01) | |
| *B66C 13/50* | (2006.01) | |
| *B66C 23/44* | (2006.01) | |
| *B66C 23/00* | (2006.01) | |
| *G06F 16/22* | (2019.01) | |

(52) U.S. Cl.
CPC ............ *B66C 15/065* (2013.01); *B66C 23/00* (2013.01); *B66C 23/44* (2013.01); *B66C 23/905* (2013.01); *B66D 1/485* (2013.01); *B66D 1/56* (2013.01); *B66D 1/58* (2013.01); *G01L 5/0009* (2013.01); *G01M 13/04* (2013.01); *B66C 2700/08* (2013.01); *G06F 16/22* (2019.01)

(56) References Cited

U.S. PATENT DOCUMENTS

| | | | |
|---|---|---|---|
| 3,724,679 A | | 4/1973 | Brownell et al. |
| 4,334,217 A | * | 6/1982 | Nield .................... G01B 7/042 175/45 |
| 4,511,974 A | | 4/1985 | Nakane et al. |
| 4,516,116 A | | 5/1985 | White |
| 5,160,055 A | | 11/1992 | Gray |
| 5,392,936 A | | 2/1995 | Solomon et al. |
| 5,788,018 A | * | 8/1998 | Mendelsohn ........... B66B 11/08 187/266 |
| 5,992,655 A | | 11/1999 | Greenberg et al. |
| 6,170,681 B1 | | 1/2001 | Yoshimatsu |
| 6,536,615 B2 | | 3/2003 | Nishikino et al. |
| 6,611,746 B1 | | 8/2003 | Nagai |
| 7,683,564 B2 | | 3/2010 | Harris et al. |
| 8,070,413 B2 | | 12/2011 | Brooks et al. |
| 8,272,521 B1 | | 9/2012 | Kemmerly et al. |
| 2005/0216116 A1 | * | 9/2005 | Nield .................... B66D 1/40 700/213 |
| 2006/0245888 A1 | | 11/2006 | Dietz et al. |
| 2007/0289931 A1 | * | 12/2007 | Henriksson ........... B66C 13/063 212/274 |
| 2008/0224111 A1 | * | 9/2008 | Urciuoli ............... B66D 1/7405 254/266 |
| 2009/0206589 A1 | | 8/2009 | Osswald |
| 2010/0012610 A1 | | 1/2010 | Rudy |
| 2011/0024378 A1 | * | 2/2011 | Pleuss .................... B66C 13/18 212/276 |
| 2013/0043448 A1 | * | 2/2013 | Balder ................. B66D 1/7405 254/266 |
| 2014/0019014 A1 | * | 1/2014 | Claxton .................. E02F 3/304 701/50 |
| 2015/0176253 A1 | | 6/2015 | Taylor et al. |
| 2015/0344272 A1 | | 12/2015 | Lin |
| 2016/0017573 A1 | | 1/2016 | Colwell et al. |
| 2016/0169413 A1 | | 6/2016 | Camacho et al. |
| 2017/0050823 A1 | * | 2/2017 | Roodenburg ........... B66C 13/06 |
| 2017/0066631 A1 | * | 3/2017 | Mupende ................. B66D 1/54 |
| 2018/0229988 A1 | | 8/2018 | Gault et al. |
| 2018/0282137 A1 | * | 10/2018 | Kaybidge ............. F16C 19/541 |
| 2018/0339891 A1 | * | 11/2018 | Ijadi-Maghsoodi ..... B64D 1/22 |
| 2019/0062127 A1 | * | 2/2019 | Hesselbein ............. B66C 15/00 |

OTHER PUBLICATIONS

Van Biezen, Michel. "Physics—Application of the Moment of Inertia (10 of 11) Acceleration=? When Pulley Has Mass", 2016. https://www.youtube.com/watch?v=TiZh9DYZ744 (Year: 2016).*
U.S. Appl. No. 62/631,059, entitled "Monitoring System and Method," filed Feb. 15, 2018.
U.S. Appl. No. 62/538,966, entitled "Load Moment Indicator System and Method," filed Jul. 31, 2017.
U.S. Appl. No. 15/815,892, entitled "Load Moment Indicator System and Method," filed Nov. 17, 2017.
Canadian Office Action dated Jul. 22, 2019 for Application No. CA 2,983,837, 4 pgs.
Canadian Office Action dated Nov. 19, 2018 for Application No. 2,983,837, 6 pages.

* cited by examiner

MONITORING SYSTEM AND METHOD

RELATED APPLICATIONS

The present application claims priority to Canadian Ser. No. 2,974,819, filed on Jul. 28, 2017; U.S. Prov. App. No. 62/538,966, filed on Jul. 31, 2017; Canadian Ser. No. 2,983,837, filed on Oct. 26, 2017; U.S. application Ser. No. 15/815,892, filed on Nov. 17, 2017; U.S. Prov. App. No. 62/631,059, filed on Feb. 15, 2018; and Canadian Ser. No. 2,997,589, filed on Mar. 7, 2018. The contents of which are all explicitly incorporated by reference in their entireties.

FIELD

This invention is in the field of hoist lifting systems, and more specifically to planning and monitoring of components in a hoist lifting system.

BACKGROUND

Vehicles that carry loads are subject to changing forces depending on the weight of the load that they are carrying and the position of the load relative to the vehicle. Additionally, many load lifting vehicles are meant to lift the load from a resting position on the ground or other surface and move the suspended load to another position before placing it down. This moving of the load causes moments acting on the vehicle as a result of the load to change as the load is moved between positions. These loads seriously affect the stability of the vehicle carrying the load and in cases where the stability is affected enough, the vehicle can tip as a result of the forces applied to the vehicle by the load.

The tipping of the vehicle can be caused by the weight of the load being too great, the load being unbalanced, a combination of the load being too great and extended too far away from the main body of the vehicle, etc. Additionally, the risk of a vehicle tipping as a result of a load can be increased by the vehicle being positioned on or moving across a sloped ground surface. While the weight of the load and its position might not be a problem if the vehicle is provided on a level ground surface, when the ground surface is sloped (including sloped in more than one direction) the slope of the ground surface can greatly affect the tipping moments that are created on the vehicle by the load. This can not only cause a load that would not cause an issue on level ground to put a vehicle in danger of tipping because of the sloped ground surface, but it can also greatly affect moments acting on the vehicle and the direction the moments are acting in.

The aforementioned conditions may become particularly acute when multiple vehicles are used to operate together to lift a single load.

SUMMARY

The invention embodies the aspects as described herein in any and all combinations.

According to an aspect, there is provided a system for monitoring one or more components of a hoisting machine having a processing structure; and a non-transitory computer-readable memory storing instructions to configure the processing structure to: receive hoist machine data; determine a rotation speed of at least one bearing from the hoist machine data; determine a travel speed of a rope from the hoist machine data; determine a load on the at least one bearing from the hoist machine data; determine a friction in the at least one bearing from the hoist machine data; and store the rotation speed, the travel speed, the load, and the friction in a maintenance database stored within the non-transitory computer-readable memory. The hoist machine data may account for changes in the at least one component during operation of the hoisting machine. A wear of the one or more components may be continuously calculated, wherein the wear comprises at least one of a bearing wear and a rope wear. The system may further comprise one or more sheave rotation sensors transmitting a rotation measurement to the processing structure.

According to another aspect, the non-transitory computer-readable memory may further comprise one or more instructions to configure the processing structure to: calculate a prediction of a remaining life of the components; and/or direct one or more maintenance activities according to the maintenance database. The maintenance activities may be selected from at least one of: inspection of the at least one component, replacement of the at least one component, directing lubrication of the at least one component, and/or automatically performing the lubrication of at least one component. The maintenance activities may be triggered by at least one of: a plain bearing wear, a sheave bearing friction factor deviation, rolling-contact bearing load-adjusted revolutions, a structural fatigue, and/or a rope life.

According to yet another aspect, the non-transitory computer-readable memory may further comprise one or more instructions to configure the processing structure to: monitor an instantaneous state of the at least one component; output an overload warning to at least one display; override operation of the hoisting machine to mitigate an overload condition; detect winch bird-caging; detect failures of the one or more bearings; create an incident log listing at least one of: failures, breaches of provisions in an operating standard, overload incidents, and create an improvement to maintenance practices. In some aspects, the non-transitory computer-readable memory may further comprise one or more instructions to configure the processing structure to: calculate an instantaneous load applied to a first sheave set axle and a second sheave set axle.

According to another aspect, the system may further comprising one or more force sensors measuring the instantaneous load applied to at least one of the first sheave set axle and the second sheave set axle. The non-transitory computer-readable memory may further comprise one or more instructions to configure the processing structure to: monitor a predicted load or a measured load of at least one of the first set axle and second sheave set axle; calculate an incoming rope tension and an outgoing rope tension; calculate a frictional characteristic for a bearing based upon the incoming and outgoing tension; compare the frictional characteristic to an acceptable range stored within the non-transitory computer-readable memory; and perform at least one of: display a maintenance message on the at least one display, update the maintenance log, dispense lubrication, limit an operation of the hoisting machine, and lower the load; and/or limit the operation of the hoisting machine to maintain a preset maximum threshold of a bearing pressure-velocity or a load-rpm.

According to another aspect, the non-transitory computer-readable memory may further comprise one or more instructions to configure the processing structure to: maintain a constant hook height regardless of a boom movement.

According to another aspect, the non-transitory computer-readable memory may further comprise one or more instructions to configure the processing structure to: calculate a prediction of a remaining life of the at least one component.

According to another aspect, the non-transitory computer-readable memory may further comprise one or more instructions to configure the processing structure to: monitor the rotation rate of the sheave rotation sensors and perform at least one of: comparing the rotation measurement to a predicted sheave rotation rate to detect rope slip or break, adjusting a rope wear log, and comparing the hoist machine data to at least one preset threshold and outputs warnings or override command inputs to remain within the preset thresholds.

In yet another aspects, the system may further comprise a cable measurement sensor measuring a cable distance of a hoist cable being retracted or extended from a lift winch. The non-transitory computer-readable memory may further comprise one or more instructions to configure the processing structure to: determine the wear of the at least one component based on the cable distance measurements; and/or determine at least one of: a sheave rotation distance, a sheave rotation rate, a sheave bearing wear rate, and a sheave bearing remaining life.

According to another aspect, there is provided a lift monitoring system comprising: a processor; a transceiver in electrical communication with the processor; a display receiving display data from the processor; a human-machine interface transmitting user control signals to the processor; the processor executes instructions from a tangible computer-readable medium to: receive, by the transceiver, stability data, loading data, positional data, and velocity data associated with at least one hoist lifting system for lifting a load; calculate at least one adjustment required to increase or decrease a loading moment or a tipping moment of the at least one hoist lifting system; determine at least one suggested command corresponding to the at least one adjustment for the at least one hoist lifting system; transmit, by the transceiver, the at least one suggested command to the at least one hoist lifting system. The processor may execute instructions to receive a margin of safety from the human-machine interface; retrieve environmental data from at least one survey database; and/or plan a multi-machine lifting operation to account for the environmental data. The environmental data may comprise at least one trench distance, at least one ground slope in lateral and longitudinal directions, at least one ground condition, a number of hoist lifting systems, and a type of each hoist lifting system. The margin of safety may account for: an imperfect spacing between the plurality of hoist lifting systems, the at least one ground slope, and/or the at least one ground condition. The at least one suggested command may be selected from: boom lift, boom lower, load hook lift, load hook lower, vehicle forward position adjustment, vehicle back position adjustment, velocity increase, and velocity decrease.

According to another aspect, the processor may override control of the at least one hoist lifting system. The override control may comprise: instructing the at least one hoist lifting system to synchronously lift or lower the load to a desired position; instructing the at least one hoist lifting system to hold the load stationary; reducing a distance between the plurality of hoist lifting systems; lifting or lowering the at least one hoist lifting system in order to transfer the load; and/or booming in or out to reduce the loading moment.

According to yet another aspect, The processor may continuously receive the stability data, the loading data, the positional data, and the velocity data; and calculate a relative stability, a relative position, and a relative speed of the at least one hoist lifting system. The processor may execute instructions to continuously display to the display of the human machine interface at least one of: the stability data, the loading data, the positional data, the velocity data, the relative stability, the relative position, and the relative speed of the at least one hoist lifting system.

According to another aspect, there is provided a hoist lifting system comprising: at least one boom coupled by a pivot to a platform, the at least one boom having a pivot end and a lift end; a boom winch located proximate to the platform; a boom cable wound to the boom winch and configured to lift the at least one boom; a first block coupled to the lift end of the at least one boom, the first block having a first set of sheaves; a lift winch located proximate to the platform; a hoist cable wound to the lift winch and passing through the first set of sheaves within the first block and supported by a first axle; a second block having a second set of sheaves receiving the hoist cable from the first block and supported by a second axle; the first set of sheaves and the second set of sheaves forming the hoist cable into a plurality of lift ropes; and a processing structure determining a wear of at least one component. The wear may be selected from a bearing wear, a rope wear, and both the bearing wear and the rope wear. The processing structure may calculates a prediction of a remaining life of the at least one component.

The hoist lifting system may further comprise a rotation sensor transmitting a rotation measurement to the processing structure. The hoist lifting system may further comprise at least one sensor measuring a hoisting load carried by the first set of sheaves, the second set of sheaves, or at least one sheave from the first set of sheaves and the second set of sheaves.

According to another aspect, there is provided a monitoring device comprising: a communication system receiving communications from at least one load moment indicator associated with at least one hoist lift system and transmitting communications to the at least one load moment indicator; a processing structure operatively coupled to the communication system; a display operatively coupled to the processing structure; a human-machine interface operatively coupled to the processing structure; a non-transitory computer-readable memory storing instructions to configure the processing structure to: receive hoist machine data from the at least one load moment indicator; display on the display at least a portion of the hoist machine data from the at least one load moment indicator; and/or determine a stability and a loading of each of the at least one hoist lift systems based on the at least one load moment indicators.

The non-transitory computer-readable memory may further comprise instructions to configure the processing structure to: determine and suggest corrective actions on the display; receive human input via the human-machine interface to provide an override command to one or more of the at least one hoist lift systems via the communication system; select an automatic override and provide the automatic override command to one or more of the at least one hoist lift systems via the communication system; and/or coordinate motion of one or more of the at least one hoist lift systems. A use of the monitoring device may be used as a lift planning tool.

According to yet another aspect, there is provided a method of monitoring an operational life of at least one component in a hoist lifting system comprises: winding or unwinding a hoist cable, the hoist cable passing through a first set of sheaves within a first block and supported by a first sheave set axle; lifting or lowering a second block by winding or unwinding the hoist cable, the hoist cable formed into a plurality of lift ropes between the first set of sheaves and a second set of sheaves, the second set of sheaves supported by a second sheave set axle; and determining, by a processing structure, a wear of the at least one component. The wear may be selected from a bearing wear, a rope wear, and both the bearing wear and/or the rope wear.

The method may further comprise calculating a prediction of a remaining life of the at least one component; receiving, by the processing structure, at least one sheave rotation measurement; and/or determining, by the processing structure, the wear based on the at least one sheave rotation measurement. The at least one sheave rotation measurement may be selected from a sheave rotation distance, a sheave rotation rate, and a combination of the sheave rotation distance and the sheave rotation rate. The method may further comprise measuring a first load force on the first sheave set axle; determining, by the processing structure, a first incoming tension and a first outgoing tension for at least one sheave within the first set of sheaves based on the first load force and the at least one rotation measurement for the at least one sheave within the first set of sheaves; determining, by the processing structure, a first frictional characteristic for a bearing associated with the first incoming tension and the first outgoing tension; comparing, by the processing structure, the first frictional characteristic to an acceptable range; recording, by the processing structure to a tangible computer-readable medium, the first frictional characteristic into a maintenance database when the frictional characteristic lies outside of the acceptable range; displaying, on an operator display, a maintenance message when the first frictional characteristic lies outside of the acceptable range; and/or limiting, by the processing structure, an operation of a lift winch when the first frictional characteristic lies outside of the acceptable range.

The operation may comprise one or more of: limiting the first frictional characteristic to the acceptable range by reducing speed of the lift winch; holding the hoist cable at a fixed length using the lift winch; dispensing lubrication to the bearing; and/or extending the hoist cable using the lift winch in order to safely lower a load.

The method may further comprise measuring a second load force on the second sheave set axle; determining, by the processing structure, a second incoming tension and a second outgoing tension for at least one sheave within the second set of sheaves based on the second load force and the at least one rotation measurement for the at least one sheave within the second set of sheaves; determining, by the processing structure, a second frictional characteristic for the bearing associated with the second incoming tension and the second outgoing tension; comparing, by the processing structure, the second frictional characteristic to the acceptable range; recording, by the processing structure to the tangible computer-readable medium, the second frictional characteristic into a maintenance database when the second frictional characteristic lies outside of the acceptable range; displaying a second maintenance message on the operator display when the second frictional characteristic lies outside of the acceptable range; and/or limiting, by the processing structure, the operation of the lift winch when the second frictional characteristic lies outside of the acceptable range.

The operation may comprise one or more of: limiting the second frictional characteristic to the acceptable range by reducing speed of the lift winch; holding the hoist cable at a fixed length using the lift winch; dispensing lubrication to the at least one component if the at least one component is the bearing; extending the hoist cable using the lift winch in order to safely lower a load.

The method may further comprise calculating, by the processing structure, a first flow force on the first sheave set axle based on the rotation measurement and a force measurement from the load; calculating, by the processing structure, a second load force estimate on the second sheave set axle based on the at least one sheave rotation measurement and a force measurement from the load; determining, by the processing structure, a second incoming tension and a second outgoing tension for the at least one sheave within the second set of sheaves based on the second load force estimate and the sheave rotation for the at least one sheave within the second set of sheaves; determining, by the processing structure, a second frictional characteristic for a bearing associated with the second incoming tension and the second outgoing tension; comparing, by the processing structure, the second frictional characteristic to the acceptable range; recording, by the processing structure to the tangible computer-readable medium, the second frictional characteristic into the maintenance database when the second frictional characteristic lies outside of the acceptable range; displaying, on an operator display, the maintenance message when the second frictional characteristic lies outside of the acceptable range; and/or limiting, by the processing structure, the operation of the lift winch when the second frictional characteristic lies outside of the acceptable range.

The operation may comprise one or more of: limiting the second frictional characteristic to the acceptable range by reducing speed of the lift winch; holding the hoist cable at a fixed length using the lift winch; dispensing lubrication to the at least one component if the at least one component is the bearing; extending the hoist cable using the lift winch in order to safely lower a load.

According to another aspects, the method may further comprise measuring, by a cable measurement sensor, a cable distance of the hoist cable being retracted or extended from the lift winch; determining, by the processing structure, the at least one component wear based on the cable distance measurements; determining, by the processing structure, at least one sheave rotation distance, at least one sheave rotation rate, or a combination of the at least one sheave rotation distance and the at least one sheave rotation rate based on the cable distance measurements; and/or accounting, by the processing structure, for changes in the at least one component during operation of the hoist lifting system.

DESCRIPTION OF THE DRAWINGS

While the invention is claimed in the concluding portions hereof, exemplar aspects are provided in the accompanying detailed description which may be best understood in conjunction with the accompanying diagrams where like parts in each of the several diagrams are labeled with like numbers, and where:

DETAILED DESCRIPTION

Many load-lifting devices are subject to compliance with strict standards that are intended to ensure component reliability and safety for the workers and public. In the absence of detailed measurements about equipment conditions between maintenance intervals, operators and maintenance planners make assumptions when deciding on maintenance and inspection activities. Frequently, these activities are run on a set time schedule, such as replacing components after a certain number of hours of service and performing inspections after a certain number of months. These simple schedules often cannot account for the degree of service to which the equipment was subjected and therefore can lead to over-maintenance of lightly used equipment or under-maintenance of heavily used equipment. Furthermore, simple schedules permit equipment to remain in service despite having been subjected to an undetected overload(s) that would require re-inspection. A lack of reliable information also makes continuous improvement of maintenance practices difficult. The aspects described herein relate to systems and processes for monitoring and/or predicting the state of various components and aspects of a load lifting system in order to generate accurate information to perform informed maintenance and inspections.

Figure 1:
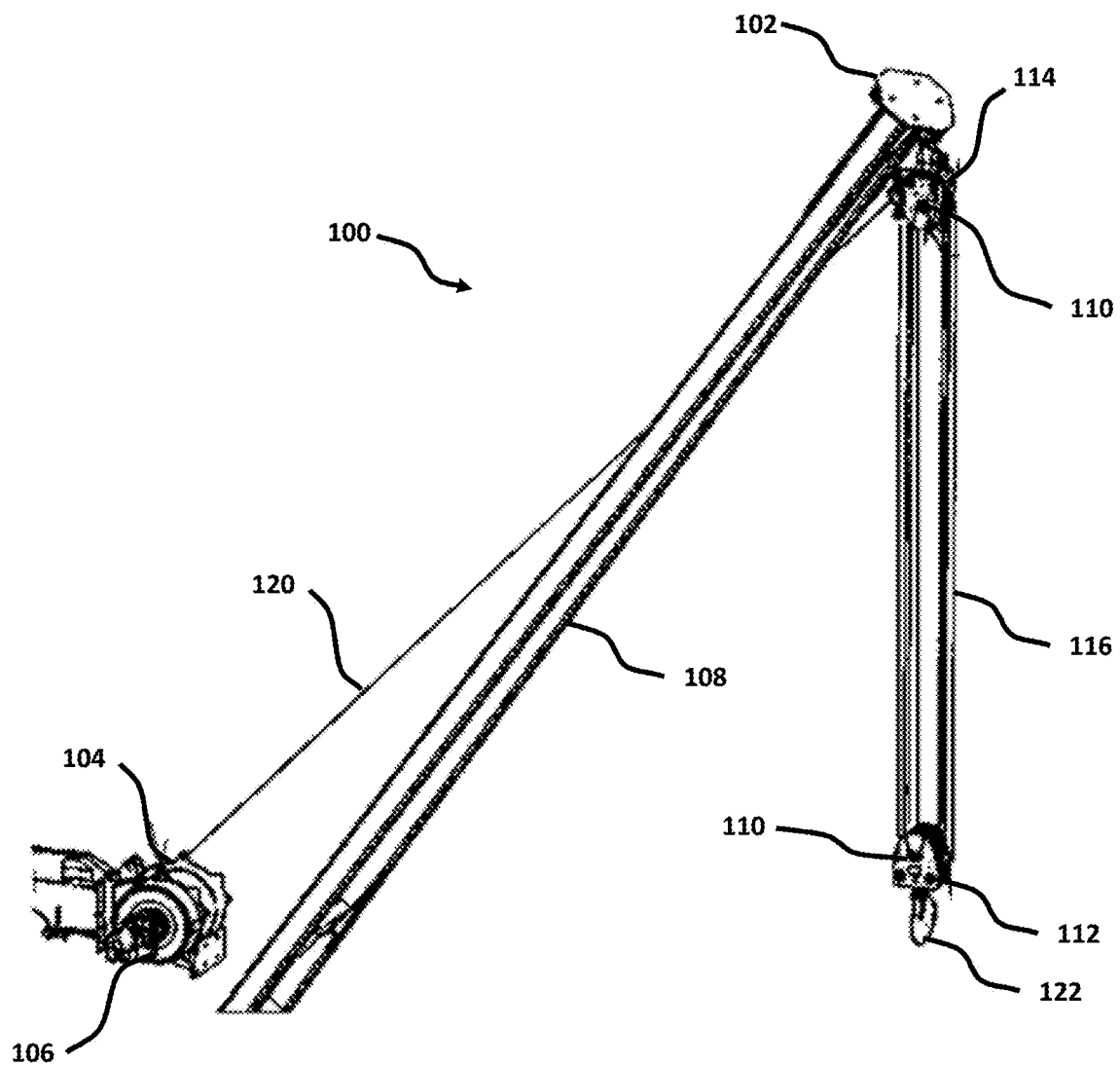
FIG. 1 is a perspective view of a hoist lifting system.
Figure 2:
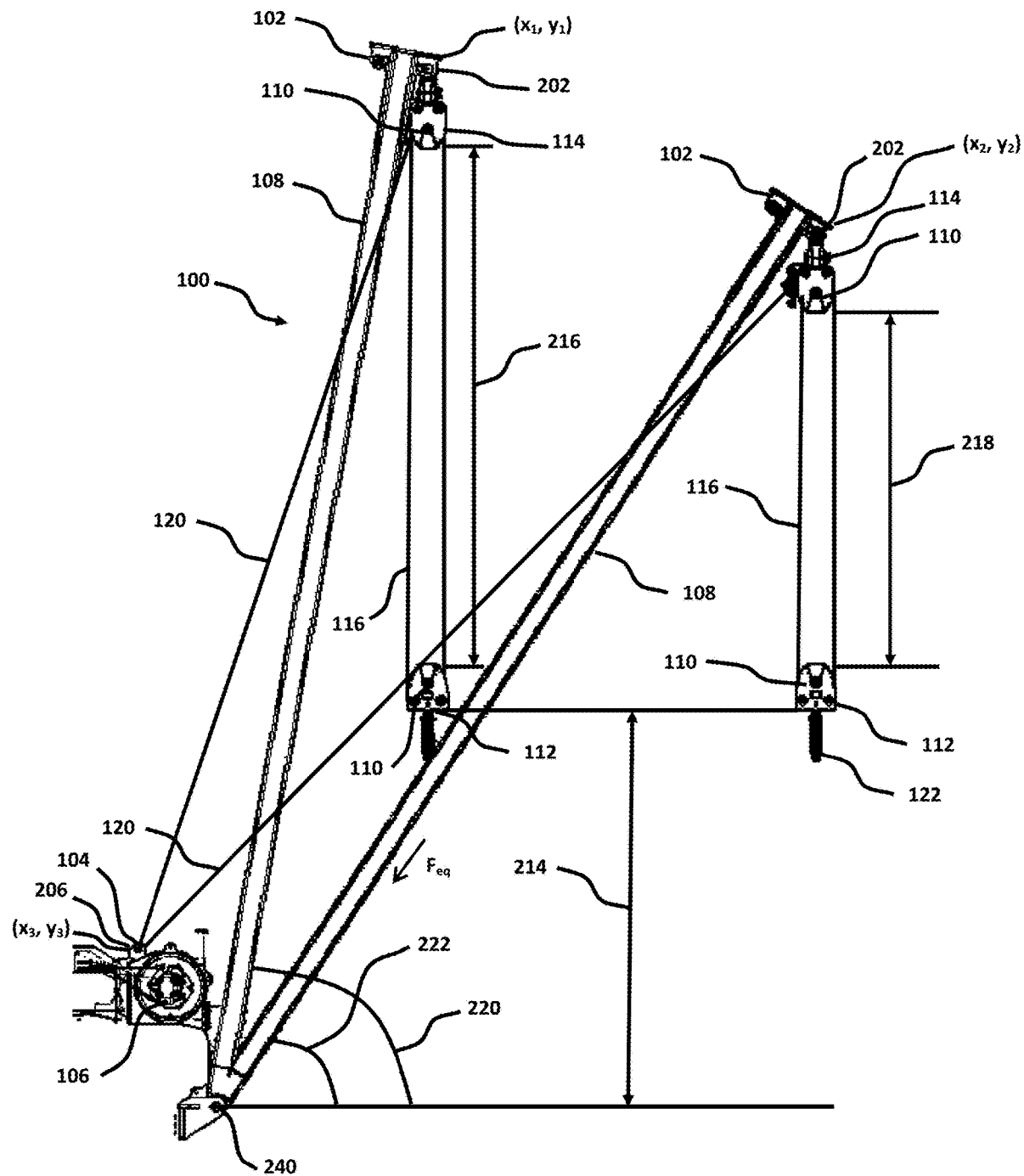
FIG. 2 is a side view of the hoist lifting system in two arm positions while maintaining a constant hook height.
Figure 3:
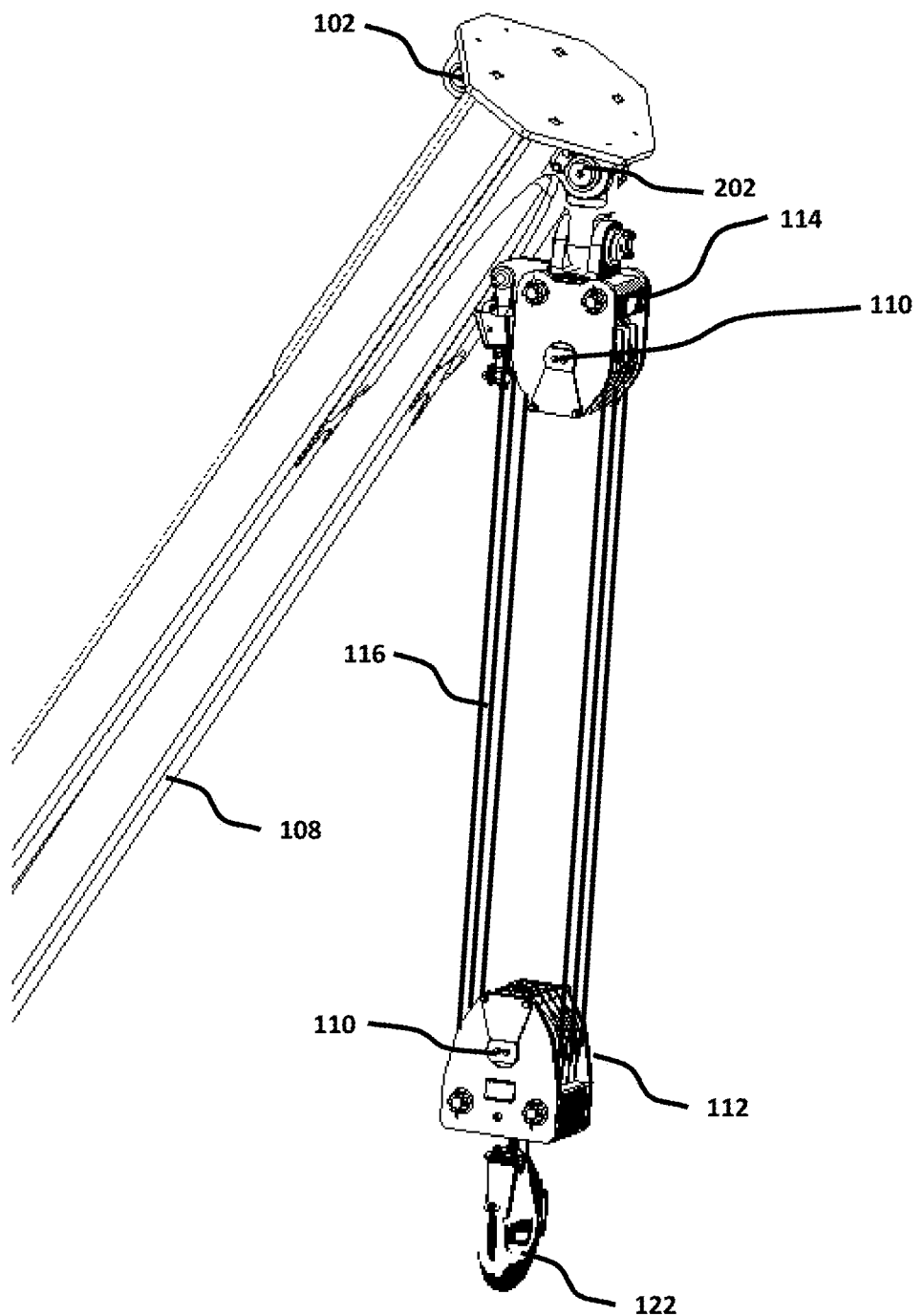
FIG. 3 is close-up perspective view of the blocks of FIGS. 1 and 2.
Figure 5:
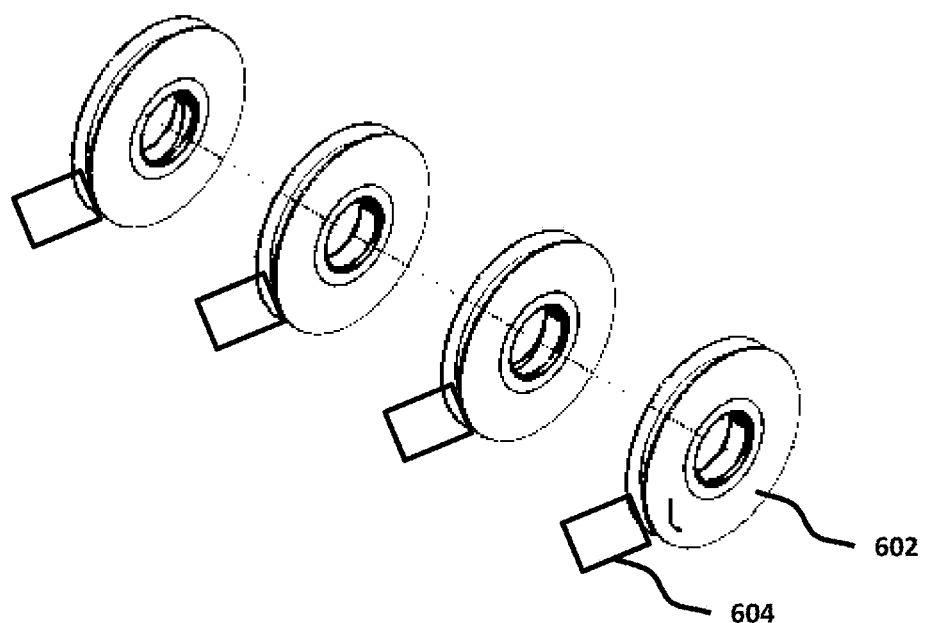
FIG. 5 is a perspective explosion view of a sheave set.
Figure 10:
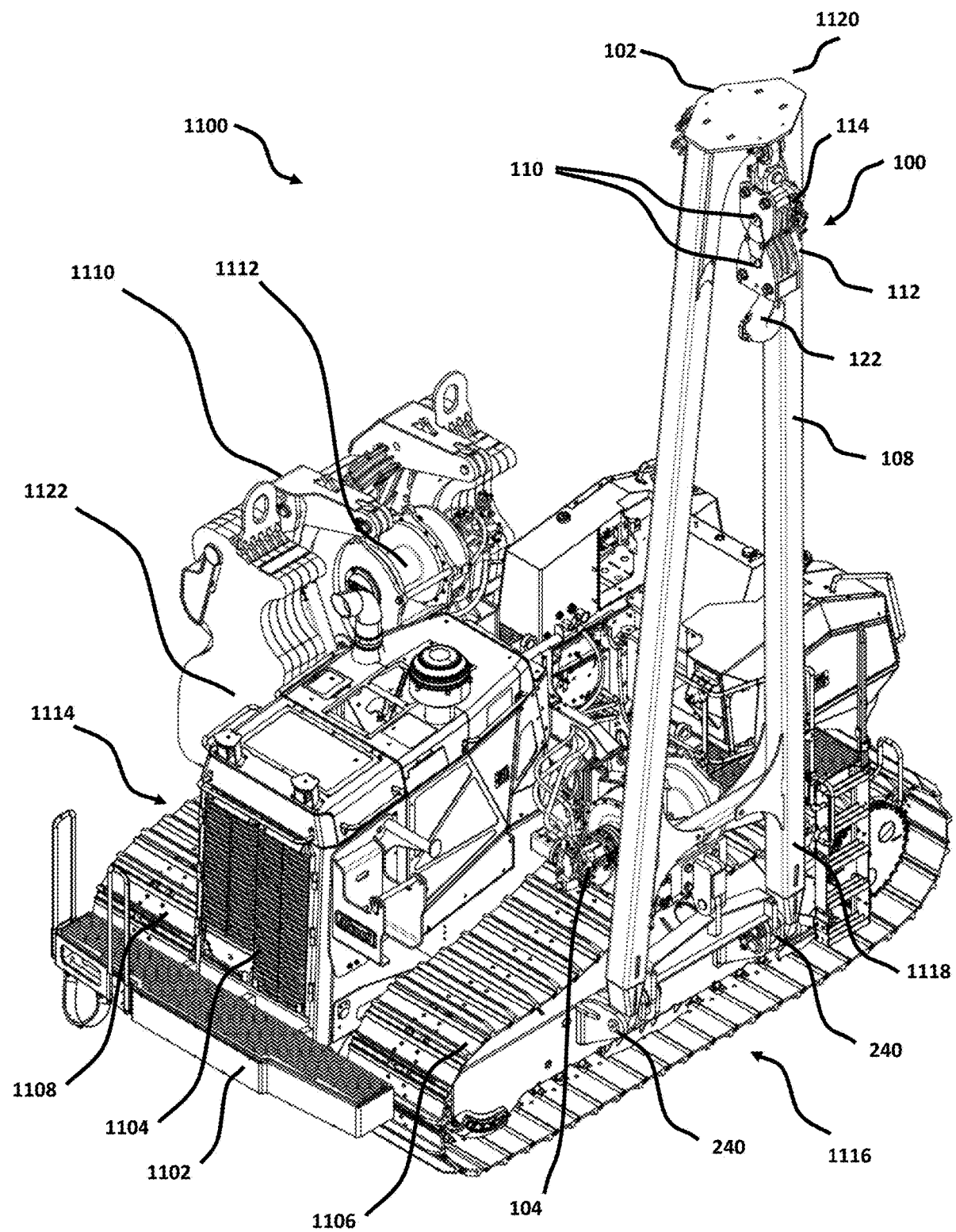
FIG. 10 is a perspective view of pipe layer machine comprising a hoist lifting system mounted on a mobile platform.

As presented in FIGS. 1 to 3, there is provided a hoist lifting system 100 for lifting pipes or other heavy loads. The hoist lifting system 100 comprises at least one boom 108 that may be coupled, using a pivot 240, to a platform 1102 (as seen in FIG. 10). The one or more boom(s) 108 may be raised or lowered using a boom winch 1112 through rotation of the pivot 240. The boom winch 1112 may be located proximate the platform 1102. In an aspect, the pivot 240 may be rotated by a boom cable (not shown) that winds and unwinds from the boom winch 1112. A boom encoder (not shown) may measure a rotation angle of the boom 108 about the pivot 240. In this aspect, the boom 108 comprises a pair of parallel arms having a proximal end 1118 (e.g. pivot end) and a distal end 1120 (e.g. lift end), where the pivot 240 may be located near or at the proximal end 1118. Other aspects may have a single arm or more than two arms. At or near an end of the boom 108 opposite the pivot 240 may be a first block mount 102 where a first block 114 may be hung using a becket 202. A second block 112 may be hung from the first block 114 using a plurality of lift ropes 116. The plurality of lift ropes 116 may be formed by passing a hoist rope 120 through at least two sets of sheaves 602. The second block 112 may comprise a hook 122 or other type of attachment for fastening to loads. The first block 114 and the second block 112 may comprise one or more pin(s) 110 that may support the set of sheaves 602, shown more clearly in FIG. 5 and described in further detail below.

In this aspect, a winch or winding drum 104 (e.g. a lift winch) may be located on a slewing platform (not shown) and/or mounted on a mobile platform 1102. In other aspects, the winch drum 104 may be located on a fixed platform (not shown). The winch drum 104 may be rotated using a motor (not shown) in order to retract or extend a hoist rope (or cable) 120 that may pass through the first block 114. The retraction or extension of the hoist rope 120 through the first block 114 may cause the second block 112 (e.g. the hook block) to be raised or lowered using the plurality of lift ropes 116.

In this aspect, the winch drum 104 may also comprise a lift winch sensor 106 (e.g. a lift winch encoder) that may measure a number of rotations of the winch drum 104 or motor. In some aspects, the lift winch sensor 106 may measure the number of rotations of a gear (not shown) between the winch drum 104 and the motor. The number of rotations may generally correspond to a length of hoist rope 120 retracted or extended and/or provide measurements of the hoist rope 120 line speed and thus relative displacement of the second block 112. In another aspect, a linear encoder may be used to measure the length of hoist rope 120 retracted or extended. When used in combination with a position sensing system 1302, as described in further detail with reference to FIGS. 10 to 11 below, an operator may choose a hook height 214 (e.g. lift height) to be maintained despite movement in a position of the boom 108 or travel of the platform 1102. A baseline position may be set by the operator and saved into a tangible computer-readable medium (e.g. a memory) by a processing structure, such as a controller 1206. From the baseline position, a relative displacement may be determined from raising or lowering of the boom 108 or changes in a ground angle as describe in further detail below and in CA 2,974,819 filed on Jul. 28, 2017 and U.S. Prov. App. No. 62/538,966 filed on Jul. 31, 2017, both of which are herein explicitly incorporated by reference in their entirety. A change in the relative displacement may be compensated for by spooling in or out the winch cable 120, within a range of motion possible without causing the first block 114 and second block 112 to come into contact.

Figure 7:
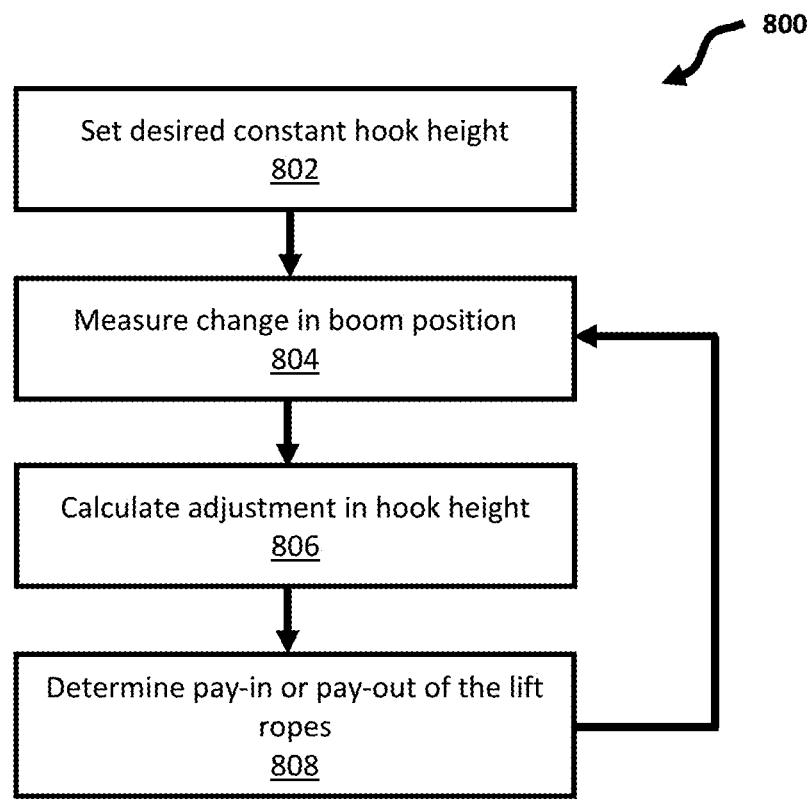
FIG. 7 is a flowchart for maintaining a constant hook height.

As presented in FIG. 2, the boom 108 may rotate about the pivot 240 from a first angle 220 to a second angle 222 or vice versa. In order to maintain a generally constant height 214 of the hook 122, a length 216, 218 of the lift ropes 116 may be shortened or lengthened using the hoist rope 120 depending on the rotation of the pivot 240. For example, with reference to FIG. 7, a desired hook height 214 may be set by the operator or the lift supervisor (step 802). A change in the position of the boom 108 position may then be measured using a boom encoder operatively coupled to the boom winch 1112 at step 804. An adjustment of the hook height 214 may be calculated at step 806. A pay-in or pay-out may then be determined for the lift ropes 116 at step 808. For example, if the pivot 240 is rotating the boom 108 from the first angle 220 to the second angle 222, then the length of the lift ropes 116 may be extended. In another example, if the pivot 240 is rotating the boom 108 from the second angle 222 to the first angle 220, then the length of the lift ropes 116 may be retracted.

For step 806, the adjustment of the hook height 214 may involve the following. When the boom 108 is moved from one lift position ($x_1$, $y_1$) to a second lift position ($x_2$, $y_2$) with respect to the location of the load-lifting winch drum 1112 ($x_3$,$y_3$), a distance between the load-lifting winch drum 1112 to the first block 114 changes. If the load lifting winch 104 is not wound in or out accordingly, the hook 122 is raised or lowered accordingly, which may increase or decrease the amount of load being supported by the load lifting system 100. This unexpected load change may cause instability of the load lifting system 100, premature wear, and/or overload of components, and other problems. By predicting this height change and automatically adjusting the load lifting winch 104 accordingly, these problems may be avoided or reduced.

A change in the distance between the first block 114 and the load lifting winch 104 may be determined by the movement of the first block 114 using an x-y coordinate system as labelled above.

With N equal to the number of line parts between the first block 114 and the second block 112, if the second block 112 stays in the same location in the y-direction (e.g. desired condition), for a boom of length, d, and angle, θ, a winch rotation angle, γ, and drum instantaneous radius, $r_w$, and the total amount of rope 120 that may be winched in or out is:

$$\Delta L_{winch} = \Delta d_{boom} + \Delta d_{block} =$$
$$\left(\sqrt{(x1-x3)^2 + (y1-y3)^2} - \sqrt{(x2-x3)^2 + (y2-y3)^2}\right) + N(y2-y1)$$

And the required lift winch adjustment angle is:

$$\Delta \gamma = \frac{180}{\pi r_w}\left[\sqrt{(d_{\beta_1}\cos\theta_1 - x_3)^2 + (d_{\beta_1}\sin\theta_1 - y_3)^2} - \right.$$
$$\sqrt{(d_{\beta_2}\cos\theta_2 - x_3)^2 + (d_{\beta_2}\sin\theta_2 - y_3)^2} +$$
$$\left. N(d_{\beta_2}\sin\theta_2 - d_{\beta_1}\sin\theta_1)\right]$$

The lift winch encoder 106 may be used to determine the extension or retraction length and/or may be used to determine the extension or retraction velocity (e.g. line speed). In other aspects, one or more motor parameters may be used to further calculate the extension and/or retraction velocity.

Figure 11:
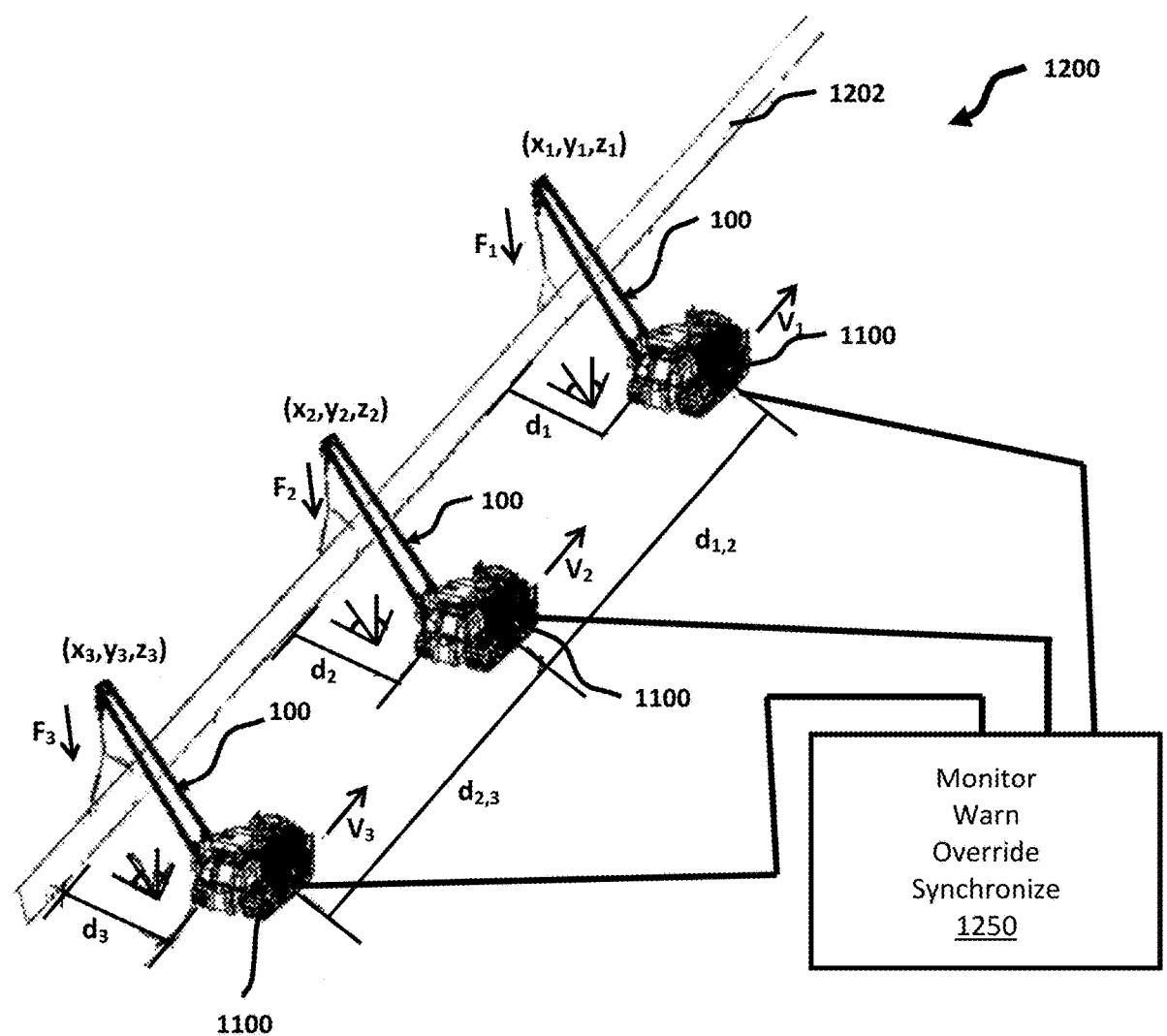
FIG. 11 is a perspective view of a plurality of hoist lifting systems and a block diagram of the hoist lifting systems in communication.

The location of the boom 108 may be measured and the rotation of the lift winch 104 tracked in order to allow an operator to set a desired height 214 of the second load block 112 and may have the desired height 214 maintained consistently regardless of how the boom 108 may be moved. Changes in the hook height 214 due to motion of the boom 108 or the platform 1102 (e.g. vehicle motion) may be calculated and the lift winch 104 wound or unwound to maintain a constant hook height 214. In a multi-machine lift environment, such as shown in FIGS. 10 and 11, the relative height of each load lifting point may correspond to the amount of load being lifted by each hoist lifting system 100. Thus, maintaining a constant hook height 214 may ensure a consistent hoisted load for each machine 1104 and may prevent overloads, premature component wear, and/or instability.

Figures 4A, 4B, 4C:
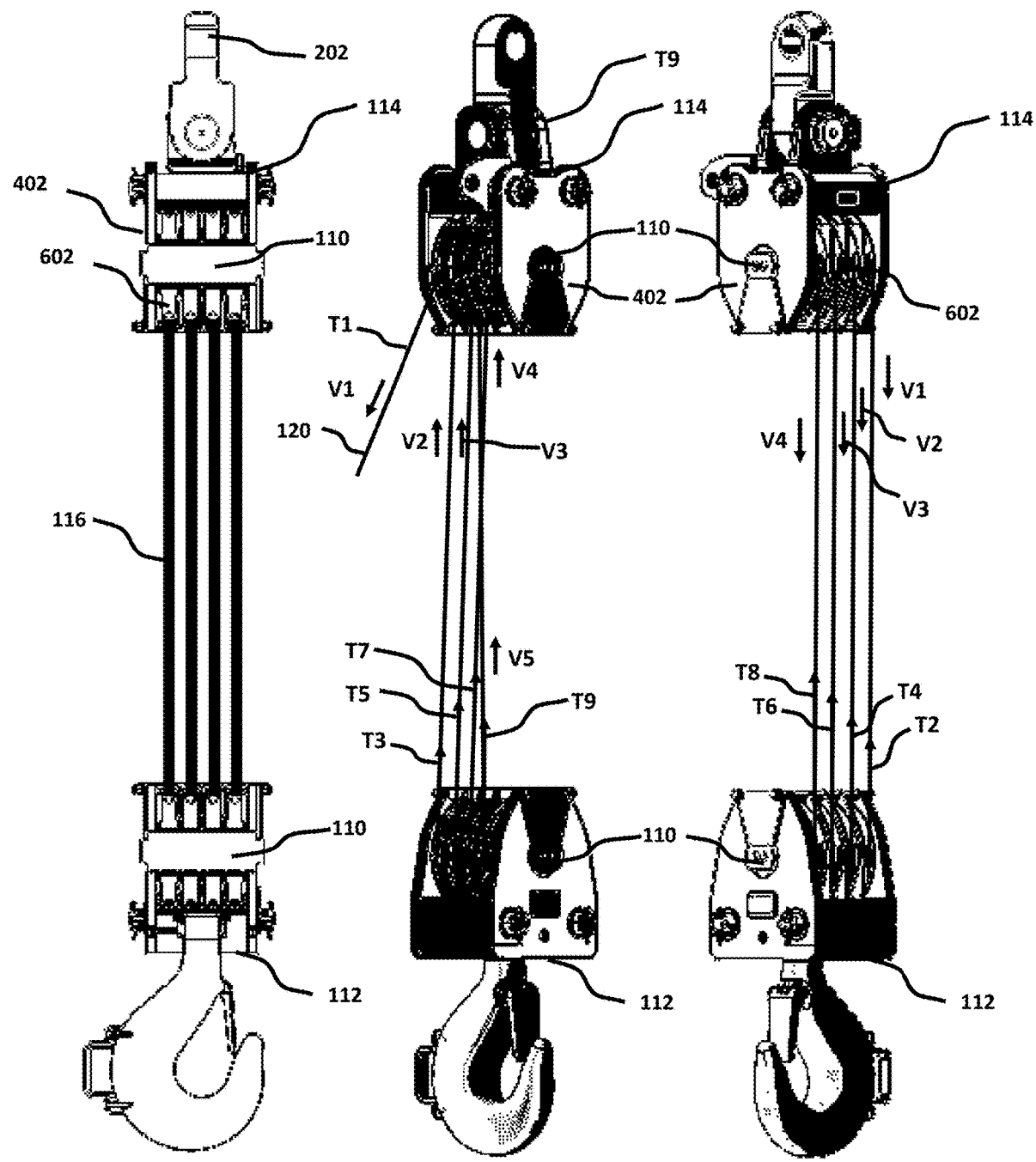
FIG. 4A is a left side cross-sectional view of the blocks.
FIG. 4B is a left perspective view of the blocks demonstrating a retraction of the hook.
FIG. 4C is a right perspective view of the blocks demonstrating an extension of the hook.

Turning now to FIGS. 4A to 4C, there is provided a close up view of the first block 114, second block 112, and the lift ropes 116. The first block 114 may comprise a shell 402 coupled to the becket 202. Within the shell 402 may be the set of sheaves 602 rotatably coupled to the pin 110 so that the set of sheaves 602 may freely rotate. Each sheave 602 may have a sheave-rotation monitoring sensor 604, such as an encoder, pulse-pickup sensor, or other similar sensor, which may provide a direct measurement of the rate and/or distance at which each sheave is rotating. In some aspects, only the sheave 602 that may experience the highest bearing wear may be monitored with the sheave-rotation monitoring sensor 604. The lift rope 116 may pass through each sheave 602 within the first block 114 and the second block 112. When the hoist rope 120 is retracted with a tension $T_1$ and velocity $V_1$, as is shown in FIG. 4B, the lift ropes 116 experience tensions $T_3$, $T_5$, $T_7$, and $T_9$. The lift ropes 116 also retract at velocities $V_2$, $V_3$, $V_4$, and $V_5$. Similarly, with reference to FIG. 4C, when the hoist rope 120 is extended at velocity $V_1$ and tension $T_1$, then the lift ropes 116 extend at velocities $V_1$, $V_2$, $V_3$, and $V_4$ with tensions $T_2$, $T_4$, $T_6$, and $T_8$ respectively. The tensions, $T_n$, and velocities, $V_n$, may be determined using the method as set forth below.

The ratio of the speed of a first part of winch rope 120 to the speed of the second block 112 is:

$$V_{winch} = N \cdot V_{block}$$

where N is the number of pulleys. N is also equal to the number of lift rope 116 lengths running between the first block 114 and the second block 112 (e.g. line parts). The speed of each part of line 116 and thus the rotational speed of each sheave 602 may be different and depends on the sheave's position in the second block 112. With the first sheave 602 numbered 1, the second sheave 602 numbered 2, and the nth sheave 602 numbered, n, and N being the total number of sheaves 602, and $V_{block}$ being the speed of the second block 112, the rope line speed, $V_n$, at each sheave 602 is given by:

$$V_n = \left(\frac{N+1-n}{N}\right) \times V_{Winch}$$

The tension in each line part 116 may be different due to friction in the bearing(s) and/or the lift ropes 116. The sheave friction and rope tension may be calculated by the force, $F_p$ on the pin 110 as measured by a force sensor (on one or more of the load pins), which comprises an incoming tension, $T_p$ and an outgoing tension, $T_o$. The outgoing tension, $T_o$, may comprise the difference of the incoming tension, $T_p$ and a friction torque, $T_r$. The change in tension from friction may be determined by:

$$T_f = F_f \frac{r_p}{r_s}$$

where $r_p/r_z$ is the ratio of a radius, $r_p$, of the pin 110 to a radius, $r_z$, of the sheave 602, and the friction force $F_f$ is given by:

$$F_f = F_p \mu_f$$

where $\mu_f$ is the coefficient of friction between the sliding surface of the bearing and the pin and/or the coefficient of rolling resistance of the bearing balls/rollers and the bearing races, or other factor corresponding to the mechanical efficiency of the rotation. This friction coefficient may comprise tabulated, simplified values such as for sliding friction between two materials and their lubricity and/or generic bearing friction values, or more explicit methodologies accounting for tribological factors and/or specific bearing parameters such as race, cage, rolling-element geometries, etc. The pin force $F^p$ may be determined by:

$$F_p = \frac{2T_i}{1 + \mu_f \frac{r_p}{r_s}}$$

and the outgoing tension, $T_o$, then becomes:

$$T_o = T_i \left[ \frac{1 - \mu_f \frac{r_p}{F_s}}{1 + \mu_f \frac{r_p}{F_s}} \right]$$

where $$\mu_f = \frac{2T_i - F_p}{F_p \frac{r_p}{r_s}}$$

Therefore, when going from one sheave 602 to the next, one sheave's outgoing tension, $T_o$, is equal to the next sheave's incoming tension, $T_i$. The sheave pin 110 and the rope tension equations for any sheave number, n, may be:

$$T_{i(n)} = \frac{F_{p(n)}}{2}\left(1 + \mu_{f(n)} \frac{r_{p(n)}}{r_{s(n)}}\right) = T_{o(n-1)}$$

where $$F_{p(n)} = \frac{2T_{i(n)}}{1 + \mu_{f(n)}\frac{r_{p(n)}}{r_{s(n)}}} = \frac{2T_{o(n-1)}}{1 + \mu_{f(n)}\frac{r_{p(n)}}{r_{s(n)}}}$$

therefore $$T_{o(n)} = T_{i(n)}\left(\frac{1 - \mu_{f(n)}\frac{r_{p(n)}}{r_{s(n)}}}{1 + \mu_{f(n)}\frac{r_{p(n)}}{r_{s(n)}}}\right) = T_{o(n-1)}\left(\frac{1 - \mu_{f(n)}\frac{r_{p(n)}}{r_{s(n)}}}{1 + \mu_{f(n)}\frac{r_{p(n)}}{r_{s(n)}}}\right)$$

and $$\mu_{f(n)} = \frac{2T_{i(n)} - F_{p(n)}}{F_{p(n)}\frac{r_{p(n)}}{r_{s(n)}}} = \frac{2T_{o(n-1)} - F_{p(n)}}{F_{p(n)}\frac{r_{p(n)}}{r_{s(n)}}}$$

The frictional characteristic of each sheave from 1 to n, with the winch tension denoted as $T_w$, then the frictional characteristic equation for sheave bearing, n, is $$S_{f(n)} = \frac{F_{p(n)}}{F_{p(n-1)}} = \frac{1 - \mu_{f(n)}\frac{r_{p(n)}}{r_{s(n)}}}{1 + \mu_{f(n)}\frac{r_{p(n)}}{r_{s(n)}}}$$

And the solution of sheave bearing, n, load is:

$$F_{(n)} = T_w\left[\prod_1^{n-1} S_{f(n)} + \prod_1^n S_{f(n)}\right]$$

allowing solving for the friction based on the measured pin force when they cannot be directly measured.

Where $\frac{F_{p(n)}}{F_{p(n-1)}} = F_{r(n)}$ and $\frac{r_{p(n)}}{r_{s(n)}} = r_{r(n)}$ resulting in:

$$\mu_{f(n)} = \frac{1 - F_{r(n)}}{r_{r(n)}(F_{r(n)} + 1)} = \frac{1 - \frac{F_{p(n)}}{F_{p(n-1)}}}{\frac{r_{p(n)}}{r_{s(n)}}\left(1 + \frac{F_{p(n)}}{F_{p(n-1)}}\right)}$$

may allow for simultaneous measurement of the load induced in each of multiple loading faces.

Without feedback regarding the load and/or friction of each sheave, and as long as the sheaves and bearings are nominally the same, the following assumptions may be made:

$$\mu_f = \mu_{f(1)} = \mu_{f(2)} = \cdots$$

$$r_p = r_{p(1)} = r_{p(2)} = \cdots$$

$$r_s = r_{s(1)} = r_{s(2)} = \cdots$$

Resulting in $$F_{(n)} = T_w[S_f^{n-1} + S_f^n]$$

Therefore, $$P_{f(n)} = \mu_f T_w[S_f^{n-1} + S_f^n]\frac{V_{winch}}{N}(N + 1 - n)\frac{r_p}{r_s}$$

Comparisons between the measured loads, along with formulas derived from the fundamental mechanics of sheaves 602, may allow for a computing structure 1302 to calculate frictional losses in each bearing. These friction coefficients may be compared with baseline values. In this aspect, the comparison determines whether the friction coefficients are within an acceptable range. In other aspects, the friction components may be compared to a threshold or a preset tolerance. These calculations may then allow monitoring of an operational life of the sheaves 602. The comparison may be used to determine that the bearings have worn, suffered a catastrophic failure such as seizing or spalling, and/or detect if the hook 122 is unable to lower under its own weight. If the hook 122 does not move despite rope 120 being paid out by the winch 104, a loss of tension in the rope 120 between the winch 104 and blocks 114, 112 may occur leading to improper winch reeving and, if left unchecked, bird-caging of the winch drum 104 and potential rope 120 kinking and/or seizure.

Through the measurement of the load weight and the line speed, a theoretical load and bearing surface velocity may be determined for each of the individual bearings (e.g. plain and/or rolling contact) of the sheaves 602. The line speed measurements may also be used to adjust a theoretical friction factor to account for bearing surface speeds. The combination of the line speed measured by the winch encoder 106 and the measured bearing loads may allow for increased data on a state of the sheaves 602. Individual pressure-velocities may be calculated for each plain bearing, and load-rotations calculated for rolling-contact bearings. Rotational speed and friction-factors may be calculated from the sensed loads to yield the frictional power losses in each bearing, and thus the heat being generated.

With the use of an individual sheave load monitoring device, a current state of the components, such as the bearings and rope, may be monitored in order to detect and/or predict failure states by additionally measuring individual bearing frictions and loads. If the friction, $\mu_f(n)$, of the bearing or entire block as calculated from the measurements of the individual load monitoring device deviates from the allowable ranges as stored in the computing structure 1302 (as described in further detail below), then the computing structure 1302 may display an indication that the bearing element may have worn excessively, failed catastrophically, needs additional lubrication, suffers from environmental contamination, and/or other types of failure or pre-failure. The computing structure 1302 may operate an automatic lubrication system, output a warning, reduce the load or speed of the components, call for an inspection, and/or other forms of remedial action.

In addition to detecting and predicting failures in the components, additional failure modes may be detected, such as a broken rope 120 or bird-caging/rat-nesting hoist drum 104. If the winch 104 is paying out and the measured load in the furthest sheaves 602 increases substantially while the load in the closest sheaves 602 decreases to zero or near zero, this may indicate that the tension is not being normalized between the cable lays within the expected range as detailed by theoretical friction factors and thus the rope 120, 116 may be bird-caging (e.g. paying out cable 120, 116 without a corresponding lowering of the hook block 112). A sudden reduction in bearing loading may indicate that the rope 120, 116 may have broken and the hook block 112 may be free-falling.

In other aspects, one or more critical operational parameters of each element, such as the load, pressure, velocity, and friction of rolling or sliding elements inside the rigging blocks 112, 114 may be determined and/or tracked over time to build an accurate record of each rolling element bearing, plain bearing, or rope operational history. For example, service information may be used to monitor the force applied to a bearing or rope 120, 116, a number of rotations of the bearing and/or a number of bending cycles of the rope 120, 116 and/or detecting and warning of overload conditions, component fatigue, etc. Measurements of the ground slope may be used to account for out-of-plane loads and additional twisting or bending induced in structural members (such as the boom 108). The conditions may be compared to thresholds set by pertinent operational standards to ensure compliance and/or warn of violations.

Figure 6:
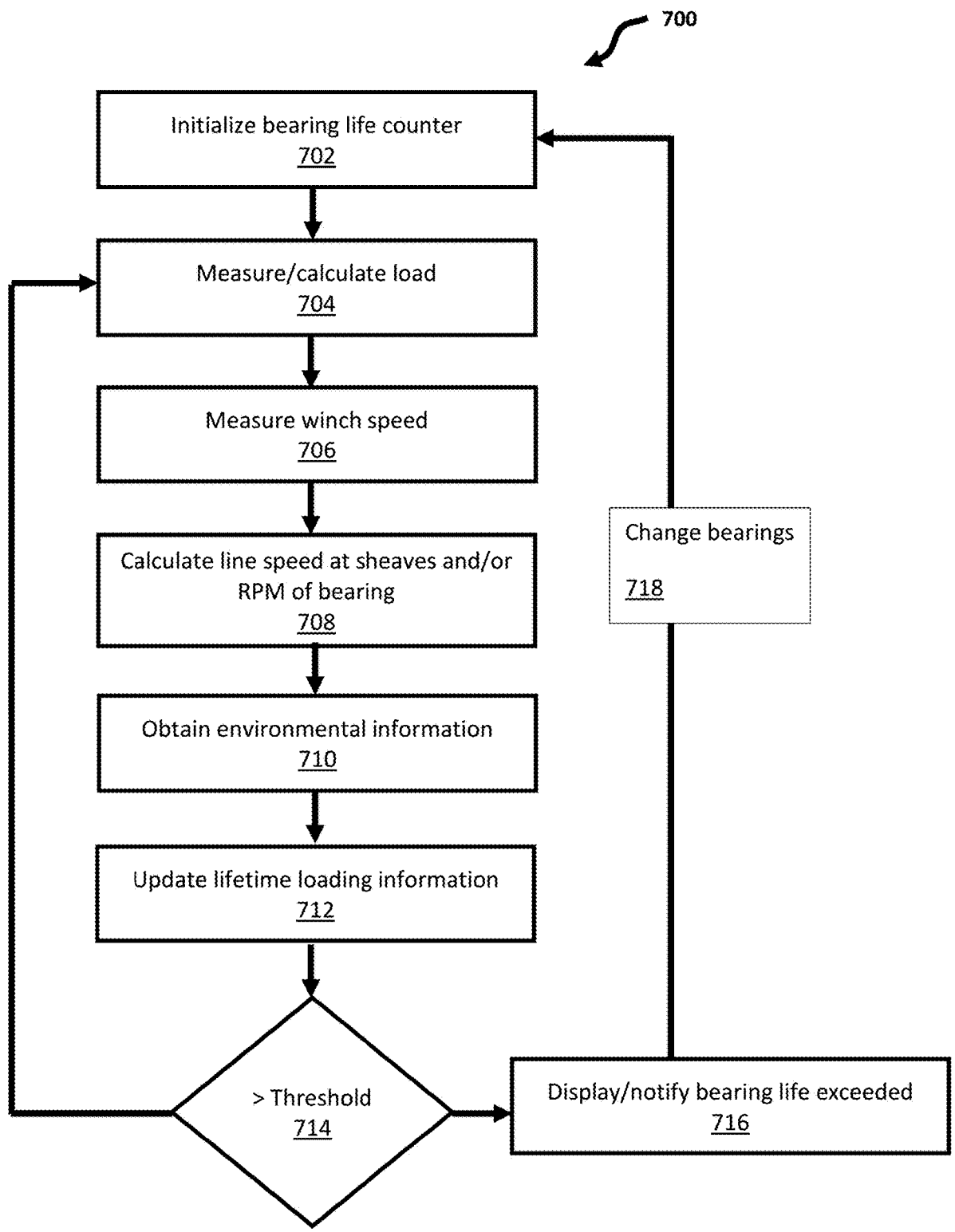
FIG. 6 is a flowchart of a bearing life assessment.

For example, with reference to a bearing life process 700 presented in FIG. 6, an estimate of a bearing life may be determined. The process 700 starts by initializing a bearing life counter (step 702). A load may then be measured and/or calculated using the processing structure 1302 at step 704. The winch speed may be measured using the winch encoder 106 as previously described (at step 706). From the measured load and the winch speed, the line speed may be calculated at the sheaves 602 and/or the bearing surface sliding speed (distance per unit time) and/or rotations-per-minute (RPM) (step 708). To further improve accuracy, it may be measured at each or some sheaves by a sheave encoder or pulse-pickup sensor or other similar sensor 604. A discrepancy between the sheave rotation rate calculated from the measurement of the winch encoder 106 and the position of the sheave within the hoisting system may indicate the rope is sliding along the surface of the sheave 602 rather than the sheave 602 rotating on the pin 110. The increment to the bearing life counter and rope life counter may be made accordingly, as this condition is substantially different than the normal operating condition. To further improve accuracy, environmental information may be determined at step 710. The bearing life counter may be updated at step 712. If the bearing life counter exceeds a bearing life threshold (step 714), a message may be output on a display and/or sent to a mobile phone or other device (not shown) via a SMS message and/or other type of notification at step 716. Corrective action may be taken at step 718, such as inspecting and/or changing the bearing. In other aspects, the winch motor may be deactivated until the bearing life counter is reinitialized at 702. If the bearing life threshold is not exceeded, then the process 700 returns to step 704. In other aspects, this process 700 may be performed without obtaining measurements directly for each bearing element, but rather calculating an estimated load in each bearing by applying estimated friction factors and using the known load calculated from the lift monitoring system as disclosed by CA 2,974,819 and U.S. Prov. App. No. 62/538,966, and the winch speed from the winch encoder 106 and/or sheave rotation speed information from sensors 604.

Figure 15:
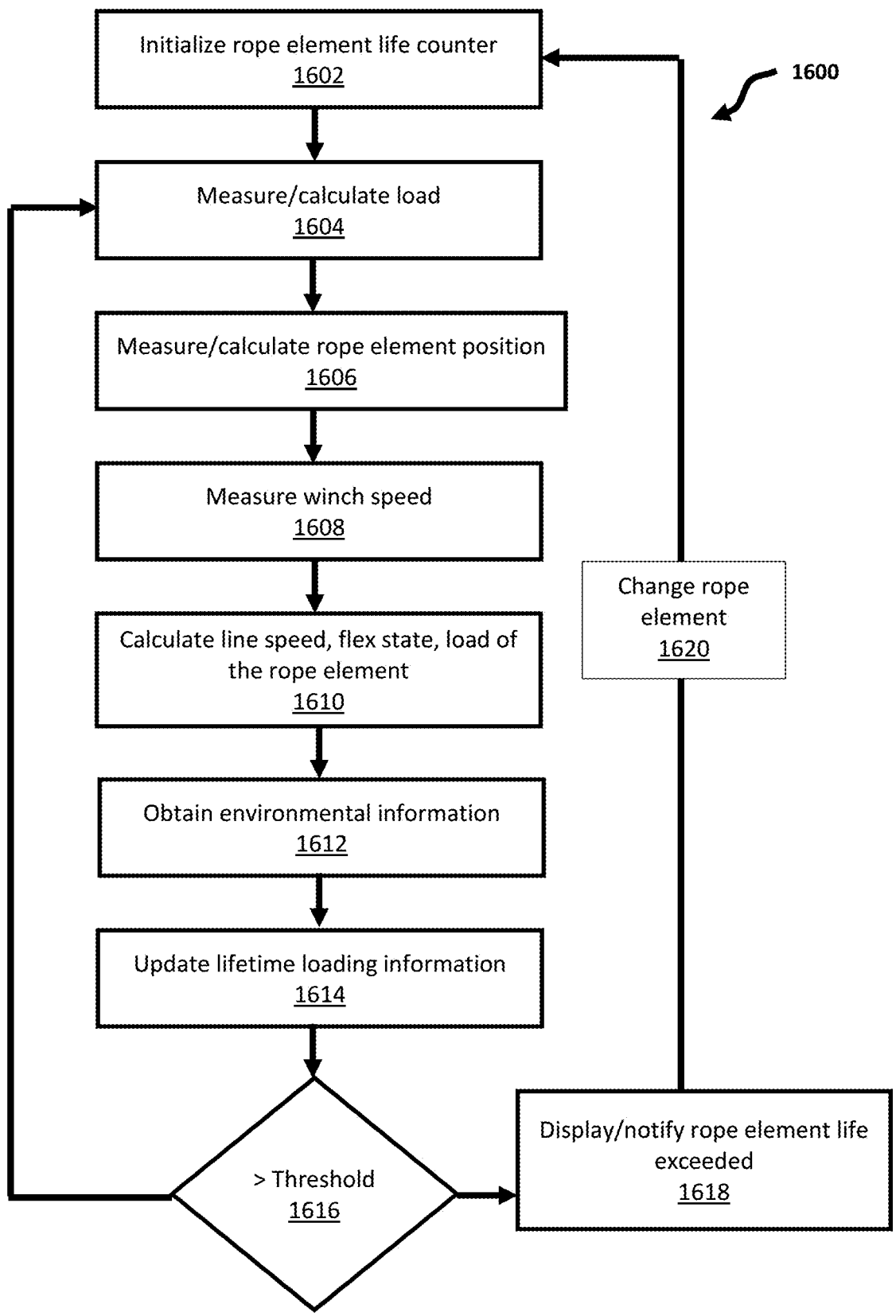
FIG. 15 is a flowchart of a rope life assessment.

Similarly, with reference to FIG. 15, a rope 120, 116 life process 1600 may determine an estimate of a rope life. The process 1600 begins by initializing a rope element life counter (step 1602). A load may be measured and/or calculated using the processing structure 1302 at step 1604. The rope element position may also be measured and/or calculated at step 1606. The winch speed may be measured using the winch encoder 106 as previously described (at step 1608) and the individual sheave rotation speeds from the sensor 604 as previously described. From the measured load and the winch speed, the line speed, flex state, and/or load of the rope element may be calculated (step 1610). To further improve accuracy, environmental information may be determined at step 1612. The rope life counter may be updated at step 1614. If the rope life counter exceeds a rope life threshold (step 1616), a message may be output on a display or sent to a mobile phone (not shown) via a SMS message or other type of notification at step 1618. At step 1620, corrective action may be taken, such as inspecting and/or changing the rope element. In other aspects, the winch motor may be deactivated until the rope life counter is reinitialized at 1602, such as after an inspection of the rope. If the rope life threshold is not exceeded (step 1616), then the process 1600 returns to step 1604.

Figure 8:
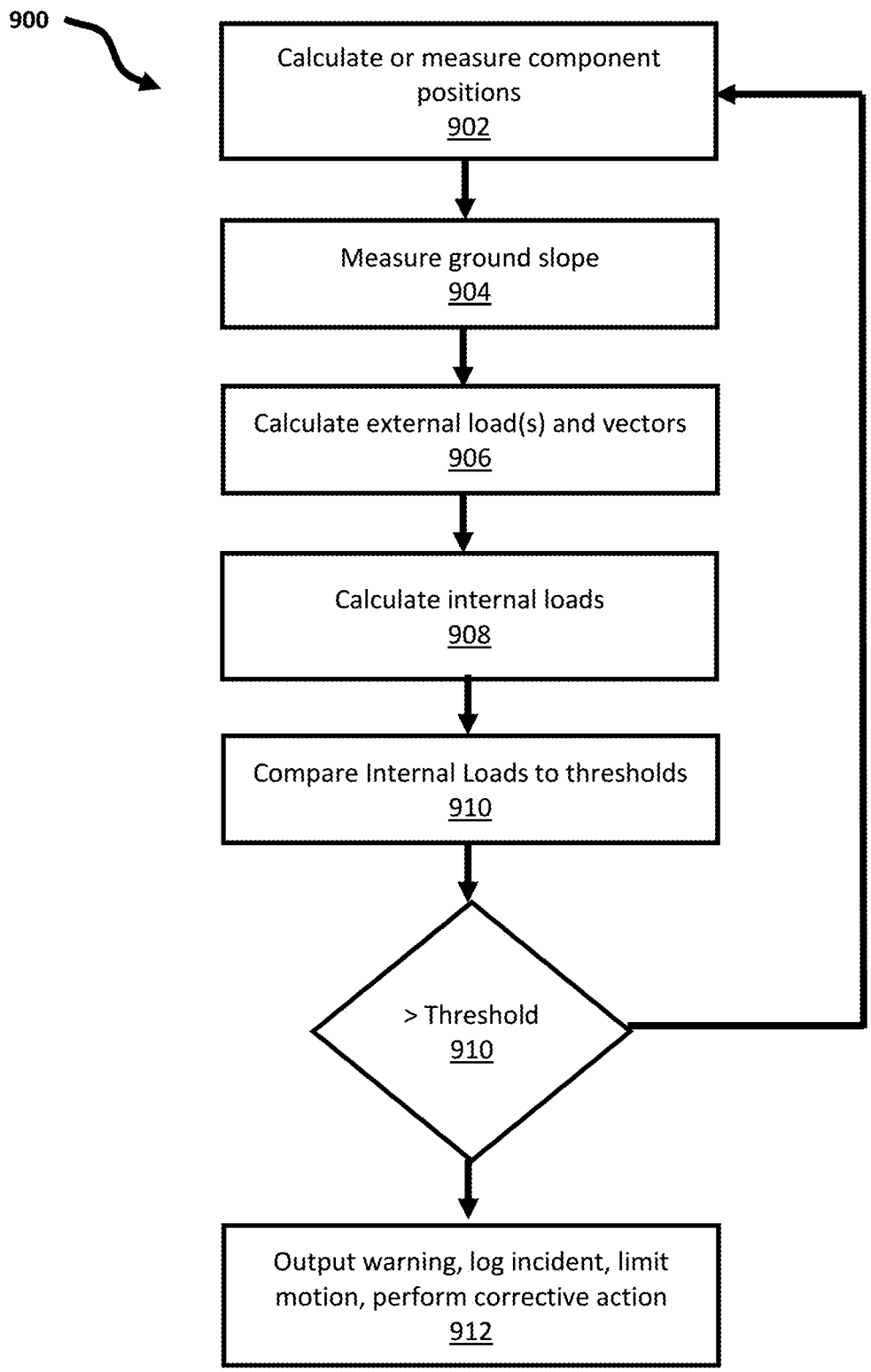
FIG. 8 is a flowchart for determining component loading.
Figure 14:
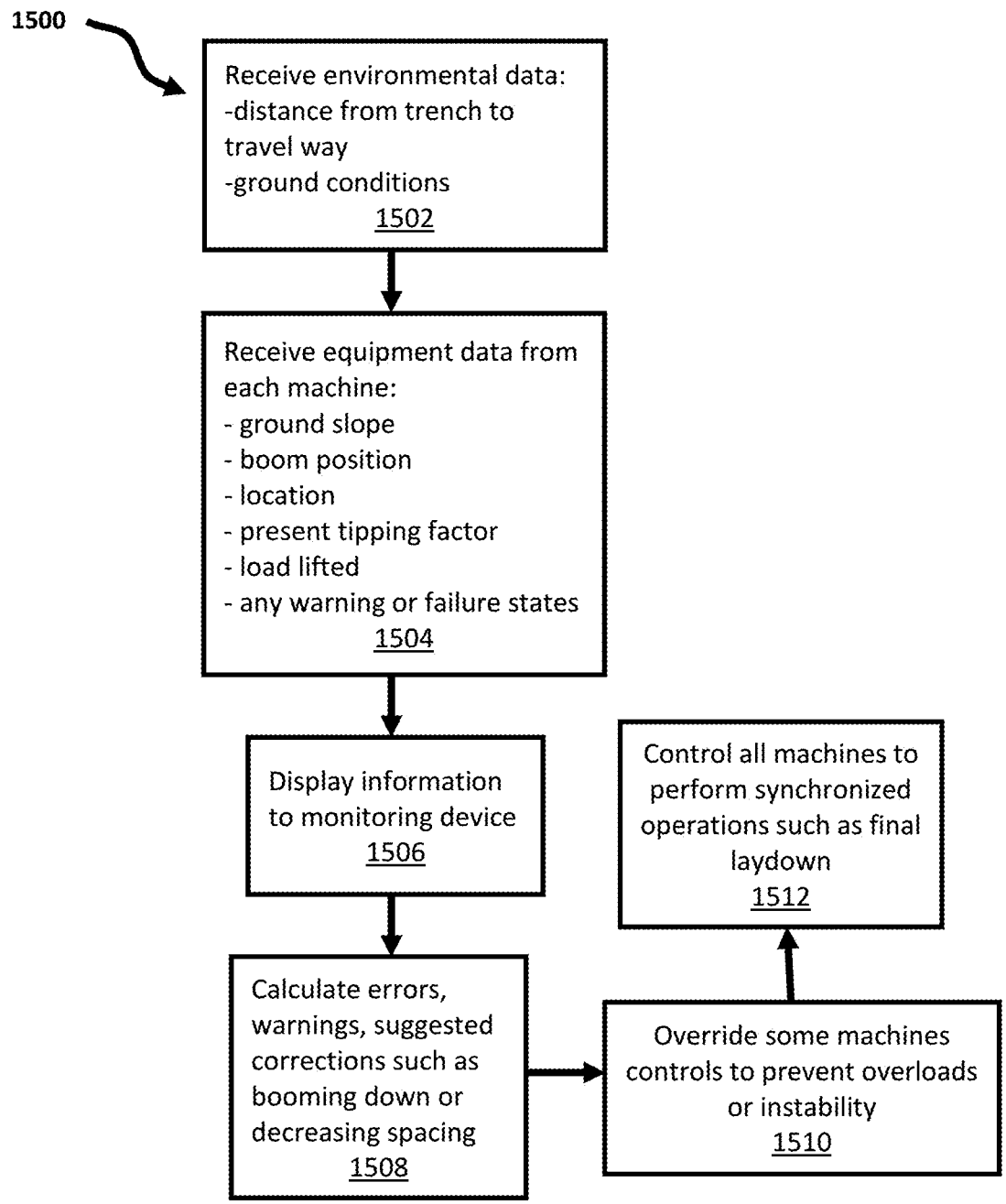
FIG. 14 is a flowchart for lift monitoring of the plurality of hoist lifting systems.

Returning to another example demonstrated in FIG. 8, a component load determination process 900 is presented. The process 900 begins by calculating or measuring component positions at step 902. A ground slope may be measured at step 904 using accelerometers, tip switches, or the like, as disclosed by CA 2,974,819 and U.S. Prov. App. No. 62/538, 966. Using the component positions and the ground slope, a set of external loads and/or vectors may be determined for the hoist lifting system 100 at step 906. A set of internal loads 908 may be calculated using the processing structure 1302 at step 908 and described in further detail below. The internal loads may then be compared with a set of thresholds at step 910. If one or more of the thresholds has been exceeded, the processing structure 1302 may execute one or more of the following: outputting a warning, logging an incident, limiting motion of the hoist lifting system 100, storing the incident in a data log file, and/or performing corrective action (immediate or otherwise) at step 912 and described in further detail with reference to FIG. 14 below. In some aspects, the warning may be transmitted to a lift monitoring system 1312.

Calculating external loads may be complicated when there is no ability to mount a load-measuring sensor directly at the load application point and the processing structure 1302 may have to imply the external load based on the measurements from other locations/components. This may require the processing structure 1302 to account for the weights and positions of the hoisting machine in order to determine an estimate of the external loading. This may be further complicated when aspects of the hoisting machine 1100 may not necessarily be constant throughout the lifting process. The lengths of cable may be spooled on winch drums and may be paid out to lower the load or adjust the position of a lifting support structure 100 such as a boom. In such cases, the weight of cable and its associated center of gravity may be shifted in position and accordingly have an effect on the righting moment and/or tipping moment of the hoisting machine 1100.

With N equal to the number of line parts between the first block 114 and the second block 112, if the second block 112 stays in the same location in the y-direction (e.g. desired condition), for a boom of length, d, and angle, θ, a winch rotation angle, γ, drum instantaneous radius, $r_w$, a distance between the first load block and second load block $d_{Blocks}$, and rope weight per unit length $W_r$, and the external load effective weight change from paying the rope 120 in or out is:

$$\Delta W_{rope} = W_r \times d_{Blocks} \times N$$

$$\Delta W_{rope} = W_r \times \Delta \gamma \times \frac{\pi r_w}{180}$$

For a system where the boom has moved from an angle $\theta_1$ to $\theta_2$ while maintaining a constant hook height above the ground surface:

$$\Delta W_{rope} = W_r \times \left[ \sqrt{(d_{\beta_1} \cos \theta_1 - x_3)^2 + (d_{\beta_1} \sin \theta_1 - y_3)^2} - \sqrt{(d_{\beta_2} \cos \theta_2)^2 + (d_{\beta_2} \sin \theta_2 - y_3)^2} + N(d_{\beta_2} \sin \theta_2 - d_{\beta_1}) \right]$$

where the weight of the rope is moved from the winch drum location to the location of the external load application point.

In a similar fashion, variations in the distance between the first set of sheaves and second set of sheaves has an effect on the load carried by each sheave and bearing as the upper sheaves carry the weight of the rope suspended beneath them. This situation affects frictional characteristic of each upper sheave bearing as the additional rope weight causes an increased friction force. As informed by the weight transfer formulas above, the corresponding sheave bearing loads may be adjusted to account for the weight of the suspended ropes by applying offset values to the sheave load and friction formulas described above.

Figure 9:
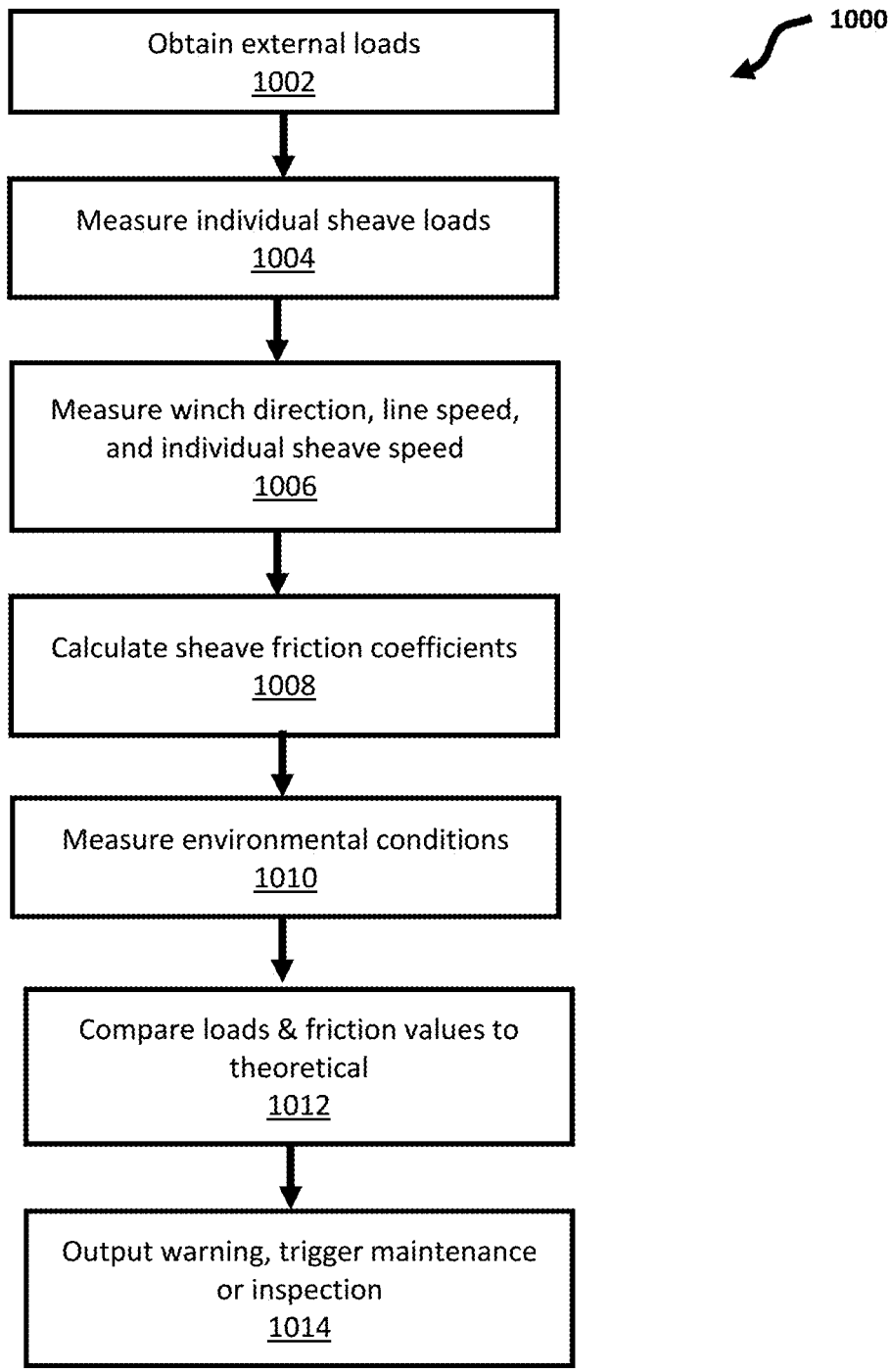
FIG. 9 is a flowchart for determining bearing wear/pileup and bird caging.

In yet another example shown in FIG. 9, bearing wear/pileup and/or bird caging detection process 1000 is presented. In step 1002, one or more external loads may be obtained as disclosed by CA 2,974,819 and U.S. Prov. App. No. 62/538,966. One or more measurements may be used to measure the individual loads on each of the sheaves 602. The winch direction, line speed, and/or individual sheave speed may be measured at step 1006. Through these measurements, one or more friction coefficients may be calculated by the processing structure 1302 for each sheave 602 at step 1008. These one or more friction coefficients may further be modified at step 1010 using one or more measured environmental conditions. A comparison of the loads and friction coefficients to the theoretical values from materials science normative references, testing results, and/or data logged from previous operations of the equipment may then be performed at step 1012. If the friction coefficients and/or the loads differ significantly from the comparison values, then an output warning or maintenance trigger may be set at step 1014. The warning or maintenance trigger may initiate an inspection of the hoist lift system 100. In some aspects, the warning or maintenance trigger may be transmitted to the lift monitoring system 1312.

The bearing wear may be estimated using the equations presented in Machine Elements in Mechanical Design ($4^{th}$ edition) by Robert L. Mott, herein explicitly incorporated by reference in its entirety, or via similar wear-load formulations such as those from the ASME Wear Control Handbook, Peterson and Winer, herein explicitly incorporated by reference in its entirety. The material wear factor may be determined by:

$$k = \frac{w}{FVT}$$

where k is the material wear factor, w is the wear (e.g. loss of weight or volume), F is the applied load, V is the surface velocity, and T is the time of operation. The load-life relationship for a rolling contact bearing may be expressed as:

$$\frac{L_2}{L_1} = \left(\frac{P_1}{P_2}\right)^k$$

where L is the life, P is the load, and k is the bearing factor (e.g. 3 for ball, 3.33 for roller). From the Palmgren-Miner rule, the main effective load is:

$$F_M = \left[\frac{\sum_i (F_i)^p N_i}{N}\right]^{1/p}$$

is the individual load among a series of i loads, $N_i$ is a number of revolutions at which $F_i$ operates, N is the total number of revolutions in a complete cycle, and p is the load-life exponent (e.g. 3 for ball, 3.33 for roller), and C the basic dynamic load rating for the bearing. Therefore, $$L = \left(\frac{C}{F_M}\right)^p = C^p \left(\frac{N}{\sum_i (F_i)^p N_i}\right)$$

Energy is force times distance and thus, the heat generated by friction $Q_f = F_f d_s$ where $d_s$ is the distance travelled at the sliding surface. The power loss due to friction is:

$$P_{fn} = F_f v_s = \mu_{f(n)} F_{p(n)} L_{S(n)} \frac{r_{p(n)}}{r_{s(n)}}$$

where $v_s$ is the surface speed, $P_{fn}$ is the frictional power loss in sheave n, $\mu_{fn}$ is the coefficient of friction in sheave n, $F_{pn}$ is the total load carried by sheave n, $L_{Sn}$ is the rope line speed at sheave n, $r_{pn}$ is the p in outside diameter at sheave n, and $r_{sn}$ is the pitch diameter of sheave n.

The friction coefficient was previously defined as:

$$\mu_{f(n)} = \frac{1 - \frac{F_{p(n)}}{F_{p(n-1)}}}{\frac{r_{p(n)}}{r_{s(n)}}\left(1 + \frac{F_{p(n)}}{F_{p(n-1)}}\right)}$$

and $$V_{winch} = N \times V_{block}$$

$$V_n = L_{s(n)} = (N + 1 - n)V_{block}$$

$$V_n = \left(\frac{N+1-n}{N}\right) \times V_{Winch}$$

Therefore, the frictional power loss in an individual bearing may be expressed as:

$$P_{f(n)} = \left[\frac{1 - \frac{F_{p(n)}}{F_{p(n-1)}}}{1 + \frac{F_{p(n)}}{F_{p(n-1)}}}\right] F_{p(n)} \frac{v_{winch}}{N}(N + 1 - n)$$

Through monitoring of the individual bearing loads, direct maintenance, inspection, and replacement activities may be directed. For example, the monitoring may initiate control of an automatic lubrication system (not shown) that dispenses lubrication based on a component's service duration and severity. Following the injection of additional lubrication, the monitoring system may further monitor the measured friction coefficient to detect if the factor has been reduced that may indicate an environmental issue such as contamination or dryness has been addressed. If the factor has not been reduced, this may indicate a bearing failure.

Although the aspects herein describe a generally stationary system, the aspects may equally be applicable to the components, systems, and operational behavior of other types of hoisting equipment, including but not limited to: pipe-laying side-booms, mobile cranes, stationary cranes, dragline miners, etc.

Although the aspects herein demonstrate a pair of parallel arms for the boom 108, other aspects may have the arms interconnected to each other between the pivot 240 and the mount 102 at the end of the boom 108. In some aspects, the mount 102 may not be located at the end of the boom 108.

FIG. 10 illustrates a pipe layer machine 1100, in this particular aspect, the pipe layer machine 1100 may comprise the hoist lifting system 100 as previously described. The pipe layer machine 1100 may place sections of pipe 1202 in a trench. The pipe layer machine 1100 may include a main body or platform 1102, an engine 1104, a first side track 1106, a second side track 1108, a cab (not shown), a side boom 108, a counterweight assembly 1110, a boom winch 1112, a lift winch 104, and a hook 122.

The main body 1102 may have a boom side 1114 and a counterweight side 1116 and hold the engine 1104 and the pair of tracks 1106, 1108. The cab (not shown) is provided for an operator to sit and control the operation of the pipe layer machine 1100.

The side boom 108 may be used to support a pipe section 1202 that may be lifted off of the ground by the pipe layer machine 1100 and to move the pipe section 1202 laterally away from the pipe layer machine 1100 over top of the trench so that the pipe section 1202 may be lowered by the pipe layer machine 1100 into the trench (not shown). The side boom 108 may be pivotally connected at a proximal end 1118 of the side boom 108 to a boom side 1114 of the main body 1102 of the pipe layer machine 1100 so that the side boom 108 extends laterally from the boom side 1114 of the main body 1102. In one aspect, the proximal end 1118 of the side boom 40 may be connected inside the boom side track 1106 on the boom side 1114 of the main body 1102 so that the boom side track 1106 rotates around the proximal end 1118 of the side boom 108.

In one aspect, the side boom 108 may have a generally triangular frame or an A-frame.

The boom winch 1112 may be used to raise and lower the side boom 108. The boom winch 1112 may be operatively attached to a distal end 1120 of the boom 108 by a boom cable (not shown). The boom winch 1112 may be attached to the main body 1102 of the pipe layer machine 1100 so that the boom cable may pass between the boom winch 1112 and the distal end 1120 of the side boom 108 in front of the cab (not shown) of the pipe layer machine 1100.

The boom winch 1112 may be wound to raise the boom 108 around the pivots 240 connected proximal end 1118 or unwound to lower the boom 108 around the pivots 240 connected to the proximal end 1118.

The boom cable may be used in conjunction with a block and tackle assembly (not shown) to increase the force applied to the boom 108 by the boom winch 1112 to aid the boom winch 1112 in raising the boom 108. A luff block (not shown) may be pivotally attached to the main body 1102 of the pipe layer machine 1100, near the boom winch 1112. The luff block may pivot up and down at a pivot point where it may be connected to the main body 1102 of the pipe layer machine 1100. A boom block (not shown) may be provided pivotally attached to the distal end 1120 of the boom 108 by a boom block pin (not shown) so that the boom block may pivot upwards and downwards around the boom block pin. The boom cable may run back and forth between the luff block and the boom block 102 to form a block and tackle system that may multiply the force that the boom winch 1112 is applying to the distal end 1120 of the boom 108. The boom cable may run back and forth between the luff block and the boom block 102 four (4) times, but it could be run fewer or more times depending on the number of pulleys provided in each of the blocks.

The lift winch 104 and hook 122 may be used to raise and lower a pipe section as previously described for the hoist lifting system 100. The lift winch 104 may be connected to the hook 122 with a hook cable 120 and the lift winch 1112 may be wound to raise the hook 122 and thereby any pipe section attached to the hook 122 or unwound to lower the hook 122.

The hoist cable 120 may be used with a block and tackle assembly (e.g. 112, 114, 116, and 110 in FIG. 1), as previously described, to increase the force the lift winch 1112 may apply to the load attached to the hook 122. With the hoist cable 116 connected to a load block 114 connected to a distal end 1120 of the boom 108 and a hook block 112 that the hook 122 may be provided on.

The counterweight assembly 1110 may be connected to the counterweight side 1114 of the main body 1102 on an opposite side of the main body 1102 from the boom side 1116. The counterweight assembly 1110 may be used to counterbalance the forces applied to the pipe layer machine 1100 created when the pipe layer machine 1100 lifts a pipe section 1202 off of the ground and moves it outwards laterally from the pipe layer machine 1100 using the boom 108 to position the pipe section 1202 over a trench. The counter weight assembly 1110 may use counterweights 1122 and may move these counterweights 1122 laterally away from the counterweight side 1114 of the main body 1102 of the pipe layer machine 1100 before the pipe section is picked up and moved laterally away from the boom side 1116 of the main body 1102 of the pipe layer machine 1100.

Figure 12:
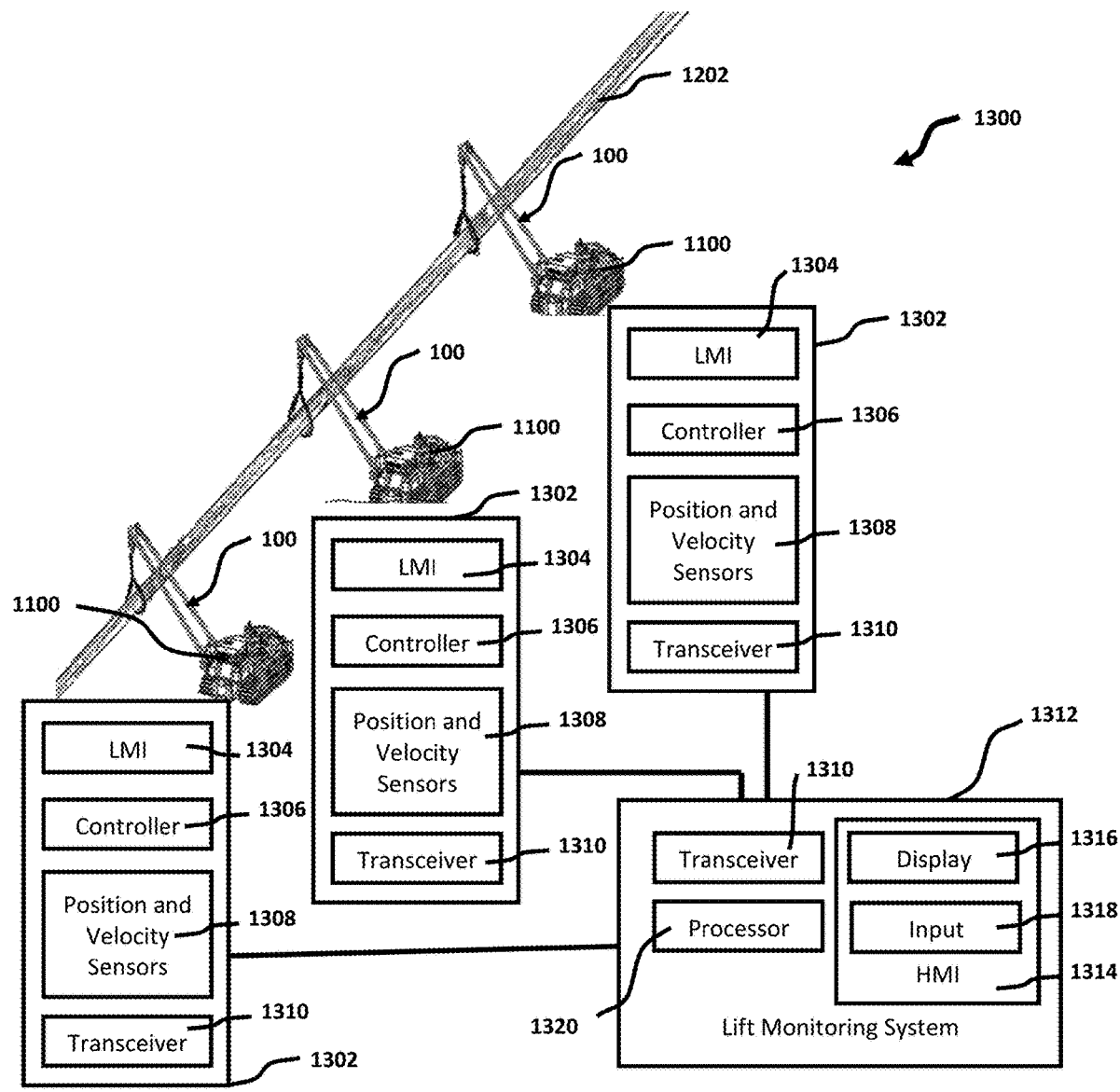
FIG. 12 is a perspective view of the plurality of hoist lifting systems in communication with a lift monitoring system.

Now with reference to FIGS. 11 to 12, pipe layer machine 1100 with hoist lifting systems 100 may operate by participating in a team lift of a load 1202 (e.g. pipe) that exceeds any one capacity of an individual hoist lifting system 100 and/or pipe layer 1100. Each individual hoist lifting system 100 may be lifting a different portion of the load 1202, and the load force for a particular hoist lifting system 100 may vary significantly depending on a position of the mobile platform 1102, position of the boom 108, lift winch inputs, the size and specification of the pipe layer machine 1100, ground conditions, distance from the trench, etc. Lift management, such as planning a number, specification, placement of the pipe layers 1100 may be determined by one or more standard lift charts provided by the equipment manufacturer. Standard lift charts are typically for level ground and may not account for optional equipment that may be installed on the pipe layer 1100 and/or hoist lifting system 100. Moreover, standard lift charts do not account for varying ground conditions.

In practice for prior multi-machine lifts, once a lift is in progress, a lift supervisor may communicate with one or more operators to coordinate the lift using handheld radios. This practice results in errors through miscommunication and/or cross-talk resulting in time delays. The operators may monitor the pipe layer machines 1100 using a load moment indicator (LMI) 1304 that indicates how close the hoist lifting system 100 may be to tipping over. In other aspects, the operator may additionally be provided with how much load 1202 currently being lifted by the hoist lifting system 100. The lift supervisor does not have direct access to this lift data, which limits coordination of the lift and/or does not ensure all machines are operating within their tolerances or in an optimal configuration.

A dynamic tipping moment indicator system 1200 comprising a plurality of hoist lifting systems 100 may be mounted on a plurality of mobile platforms 1104. In this aspect, the hoist lifting systems 100 may be lifting a load 1202 comprising a pipe (or pipe section). Each of the hoist lifting systems 100 may measure or calculate a plurality of boom coordinates $(x_1, y_1, z_1)$ to $(x_n, y_n, z_n)$. Each hoist lifting system 100 may measure a load force vector $F_1$ to $F_n$. A distance $d_1$ to $d_n$ of the pipe layer machine 1100 from the load 1202 and the velocity vector $V_1$ to $V_n$ of the pipe layer machine 1100 may also be measured by such methods as GPS modules, radar, lidar, ultrasonics, or calculated by such methods as accelerometer dead-reckoning. Each hoist lifting system 100 may determine a distance $d_{1,2}, d_{2,3} \ldots d_{n-1,n}$ to the next mobile platform 1102 by such methods as GPS modules, radar, lidar, ultrasonics, near-field communication, or calculated by such methods as accelerometer dead-reckoning. In the example 1200 presented in FIG. 11 and the example 1300 presented in FIG. 12, there are three hoist lifting systems 100, but there may be more or fewer hoist lifting systems 100. At least a portion of the data measured and/or generated by each of the hoist lifting systems 100 may be provided to a lift planning and monitoring system 1250 using data communication (e.g. wired or wireless). The lift planning and monitoring method and system 1250 may monitor, provide warnings, override unsafe control actions, and/or synchronize each of the hoist lifting systems 100 as described in further detail below.

Each hoist lifting system 100 may comprise a processing structure 1302 having a lift moment indicator 1304, a controller 1306 (having at least one processor and computer-readable memory), a plurality of position and velocity sensors 1308 and a transceiver 1310 to communicate. Each processing structure 1302 may measure and/or calculate external loads and vector projections into a principle plane of the hoist lifting system 100. The choice of principle planes may be selected reduce computational complexity depending on the specific operation being done by the processing structure 1302. The processing structure 1302 may use these measurements from the lift moment indicator 1304 and/or the measurements of each individual bearing face to determine a live load induced in structural members, such as for example the boom 108, as described above.

Each of the processing structures 1302 may communicate status data (e.g. data from the lift moment indicator 1304 and/or component monitoring systems) about their respective hoist lifting system 100 to a lift monitoring system 1312. The lift monitoring system 1312 may comprise a transceiver 1310, a processor 1320, and a human-machine interface 1314. The human-machine interface 1314 may comprise a display 1316 for presenting at least a portion of the status data from the hoist lifting systems 100 and an input device 1318, such as a touch screen, keyboard, joystick, mouse, etc. The lift monitoring system 1312 may execute a lift planning and monitoring method and system 1250. The human-machine interface 1314 may receive a margin of safety input from an operator. In some aspects, the human-machine interface 1314 may limit the margin of safety to within industry standard acceptable tolerances.

The lift monitoring system 1312 may provide enhanced quality of data (e.g. information) presented on the display 1216 to supervisors. Each processing structure 1302 on the pipe layer machine 1100 may calculate the stability and loading of each individual machine 1100. The lift monitoring system 1312 receives this information, along with the positional and velocity information from the sensors and may calculate position adjustments required to increase or decrease the loading and/or tipping moment on each pipe layer machine 1100 using the previously input weight per unit length of the lifted load and/or by calculating the input weight based on the spacing and measured lifted load of each pipe layer machine 1100. The lift monitoring system 1312 may suggest commands such as boom lift/lower, load hook lift/lower, vehicle forward/back position adjustments, positioning closer to/further from the hoisted load, or velocity increase/decrease adjustments to vary the amount of load and/or tipping moment for each pipe layer machine 1100. For example, the lift monitoring system 1312 may display live status data for each hoist lifting system 100 and/or warn of impending potential problems and suggest corrective actions. In some aspects, the lift monitoring system 1312 may override controls of one or more of the hoist lift systems 100 and/or may shut down lift operation of one or more of the hoist lift systems 100. In some aspects, one or more hoist lift systems 100 may be overridden to hold the load in a stationary position. In some aspects, the lift monitoring system 1312 may assume control of all hoist lift systems 100 to synchronously lift or lower a load to a desired position while monitoring each hoist lift system 100 to ensure none are overloaded.

When the hoist lifting systems 100 are operating on level ground, each may behave analogously to a two-force member, omitting friction in the pivot 240, with a resultant force may be calculated from a luff load cell (not shown), boom angle 220, 222, and a calculation of a resulting slung load.

Using this equivalent two-force member load and the material and geometry of the boom, a structural safety may be calculated as a compressive load may be compared to a critical buckling load of the boom 108, and the shear stress in the pivot pins 240 compared to their maximum allowable stress.

On level ground, the force vector, $F_{eq}$, acts along the boom 108 with an equal force vector acting in the opposite direction to the force vector, $F_{eq}$ to maintain the boom 108 in a static position. Knowing the measured upper luff force, $F_{upperluff}$ and angle of the boom 108 to the boom cable, the force vector, $F_{eq}$ may be:

$$F_{eq} = 2F_{upperluff} \cos(\varepsilon)$$

where the boom strength factor is equal to the critical buckling load of the boom 108 divided by $F_{eq}$.

When on angled ground, operating on fore-aft slopes may induce bending moment in the boom 108 and may lead to unequal loads in the pivot pins. Therefore, the additional load in the pins may be given by:

$$\Delta P_1 = \frac{F_z d_{boom}}{d_{pins}}, \quad \Delta P_2 = \frac{F_z d_{boom}}{d_{pins}}$$

where the bending load on the tip, $F_z$, is:

$$F_z = \frac{F \tan(\delta)}{\sqrt{(\tan\lambda)^2 + 1 + (\tan\delta)^2}} = F \sin(\delta)$$

and $d_{pins}$ is the distance between to pins and $d_{boom}$ is the length of the boom 108. The stress on the boom 108 due to the bending moment is more complicated as it is a non-prismatic beam in this loading direction, and is calculable using the geometry of the boom structure.

Operating on complex ground slopes, the mechanics of the boom 108 may change as the mechanics may no longer be analogous to the two-force member. The projection of a gravitational vector into the principle planes of the hoist lift system 100 may show that an out-of-plane component creates a lateral bending moment on the boom tip 102. This force may act perpendicular to an axis of the boom pivot 240 and thus does not directly affect its pivoting. It may create a bending moment in the boom 108 and thus may create bending stresses and potential failure modes not accounted for in the level ground critical buckling case. An induced torque may also alter reaction forces in the pivot 240, increasing the load in one and thus decreasing the load in the other as they act to oppose this moment. Accordingly, the shear stress in the maximally loaded pivot 240 may be significantly higher than would be caused by a similar slung load carried on level ground.

In this aspect, the lift moment indicator 1304 may accurately predict hoist lifting system 100 tipping mechanics on slopped ground. Further details of the lift moment indicator 1304 are provided in in CA 2,974,819 and U.S. Prov. App. No. 62/538,966, both of which are herein explicitly incorporated by reference in their entirety. The lift moment indicator 1304 may comprise a sensor array for determining a tipping factor of the hoist lifting system 100 and/or mobile platform 1102 in real-time. The tipping factor for each hoist lifting system 100 may be provided via communication to the lift monitoring system 1312. In some aspects, the sensor array may use sensors that are provided on the main body 1102 instead of on the boom 108. In this manner, these sensors may be less likely to get damaged during removal, transport and reinstallation of the boom 108.

The sensor array may include a boom winch load pin, a luff accelerometer, and a boom winch encoder. Additionally, a vehicle accelerometer may be provided on the main body 1102 and the lift winch encoder 106 may be provided on the lift winch 104, as previously described. The load pin may be pivotally connect the luff block to the main body 1102 to determine the force being applied to the luff block by the boom cable. This force measured by the load pin may indicate the force being applied to the distal end 1120 of the boom 108 by the boom cable running between the luff block and the boom block. The luff accelerometer may be positioned on the luff block and used to measure the position of the luff block and in particular the angle of the luff block. This angle of the luff block may indicate approximately the angle of the boom cable running between the luff block and the boom block.

The boom winch encoder may be used to more accurately approximate an angle of an imaginary line running between the load pin where the luff block is pivotally connected to the main body 1102 and the distal end 1120 of the boom 108. The luff accelerometer may measure the angle of the luff block. But because of friction between the luff block and the load pin, slack in the boom cable as it runs between the luff block and the boom block, etc., the luff block may not always point directly at the distal end 1120 of the boom 108. Instead, the angle of the luff block may lag behind the angle of an imaginary line passing between the load pin and the distal end 1120 of the boom 108 when the boom 108 is being raised. Therefore, the luff accelerometer may tend to indicate an angle that may be slightly less than the actual angle when the boom 108 is being raised. Additionally, the pivoting of the luff block may also lag when the boom 108 is being lowered so that the angle of the luff block being measured by the luff accelerator may tend to be measured as greater than the angle of an imaginary line passing between the load pin and the distal end 1120 of the boom 108.

The boom winch encoder may be used to adjust the angle of the luff block determined by the luff accelerometer. When the boom winch encoder determines that the boom winch 1112 is winding and therefore raising the boom 108, the angle measured by the luff accelerometer may be adjusted by adding an amount (e.g. a correcting offset) to the measured angle to accommodate for the luff block angle lagging and not pointing directly at the distal end 1120 of the boom 108. This correcting offset may allow a more accurate approximation of an angle to the distal end 1120 of the boom 108. Conversely, when the boom winch encoder may determine that the boom winch is unwinding and therefore lowering the boom 108, the angle measured by the luff accelerometer may be adjusted by subtracting the correcting offset from the measured angle to adjust the measured angle and get a more accurate approximation of the angle to the distal end 1120 of the boom 108.

The vehicle accelerometer may be used to determine an angle of incline of the pipe layer machine 1100 from side-to-side, front-to-back, and/or a combination of these slopes. For example, if the pipe layer machine 1100 is positioned on flat ground then the lateral incline angle of the pipe layer machine 1100 is 0-degrees and the weight of the pipe layer machine 1100 will act directly downwards from the center of gravity of the pipe layer machine 1100 onto the ground surface supporting the pipe layer machine 1100. However, if the pipe layer machine 1100 is on a lateral sloping ground surface, depending which way the pipe layer machine 1100 is inclined, the incline of the pipe layer machine 1100 may either cause the righting moment to be greater than it would be if the pipe layer machine 1100 was on flat ground while the tipping moment may be less or conversely may cause the righting moment to be less than it would if the pipe layer machine 1100 was on level ground while the tipping moment may be greater. The lateral incline of the pipe layer machine 1100 may also affect the position of the distal end 1120 of the boom 108, because if the pipe layer machine 1100 is tilted, the distal end 1120 of the boom 108 may be in a different position than it would be in if the pipe layer machine 1100 was on level ground.

The front-to-back incline of the pipe layer machine 1100 similarly affects the righting moment and the tipping moment. Most tipping factors account only for tipping about the first track 1106 of the pipe layer machine 1100, however the use of the sensor array may allow the calculation of frontwards and rearwards tipping factors which describe the likelihood of the pipe layer machine 1100 to tip over about a tipping fulcrum located at either the front or rear edge of the first track 1106 where they contact the ground, respectively.

The lift winch encoder 106 may be positioned on the lift winch 104 to determine the direction of rotation of the lift winch 104 and the distance the hook block 112 has travelled and the direction of travel.

To determine the tipping stability of the pipe layer machine 1100, the sensor array may be used to measure a number of forces and positions and then this data may be used to determine the position of the distal end 1120 of the boom 108, which in turn may be used to determine the slung load (the weight of the load suspended from the boom 108). With the slung load and the position of the distal end 1120 of the boom 108 determined, the tipping moment acting on the pipe layer machine 1100 and the counteracting righting moment may be determined and used to determine the tipping stability or "tipping factor" of the pipe layer machine 1100.

A tipping stability for each pipe layer machine 1100 may be expressed in many ways. One way of expressing this tipping stability may be a tipping factor (or percent tipping), which is a numerical expression of the tipping stability. In one aspect, a tipping factor having a value less than 1 or 100% represents that the machine has not tipped, a value of 1 or 100% represents that the machine has reached its exact tipping point, and a value greater than 1 or 100% represents that the machine is tipping over. This tipping factor may be the tipping moment created by the load being lifted by the pipe layer machine 1100 divided by the righting moment which is the moment created by the weight of the pipe layer machine 1100 with the moment created by the boom 108 of the weight subtracted from it. This tipping factor may be expressed in numerous ways, including as follows:

$$TippingFactor = \frac{TippingMoment}{PipelayerWeightMoment - BoomWeightMoment}$$

Or as follows:

$$TippingFactor = \frac{TippingMoment + BoomWeightMoment}{PipelayerWeightMoment}$$

Or as follows:

$$TippingFactor = \frac{CoGDistanceToTippingFulcrum @ CurrentSlope}{CoGDistanceToTippingFulcrum @ ZeroSlope}$$

Or as follows:

$$TippingFactor = \frac{CurrentSlope}{CalculatedTippingSlope}$$

Or as follows:

$$TippingFactor = 1 - \frac{RightingMoment @ CurrentSlope}{RightingMoment @ ZeroSlope}$$

Figure 13:
FIG. 13 is a flowchart for lift planning of the plurality of hoist lifting systems.
Figure 13:
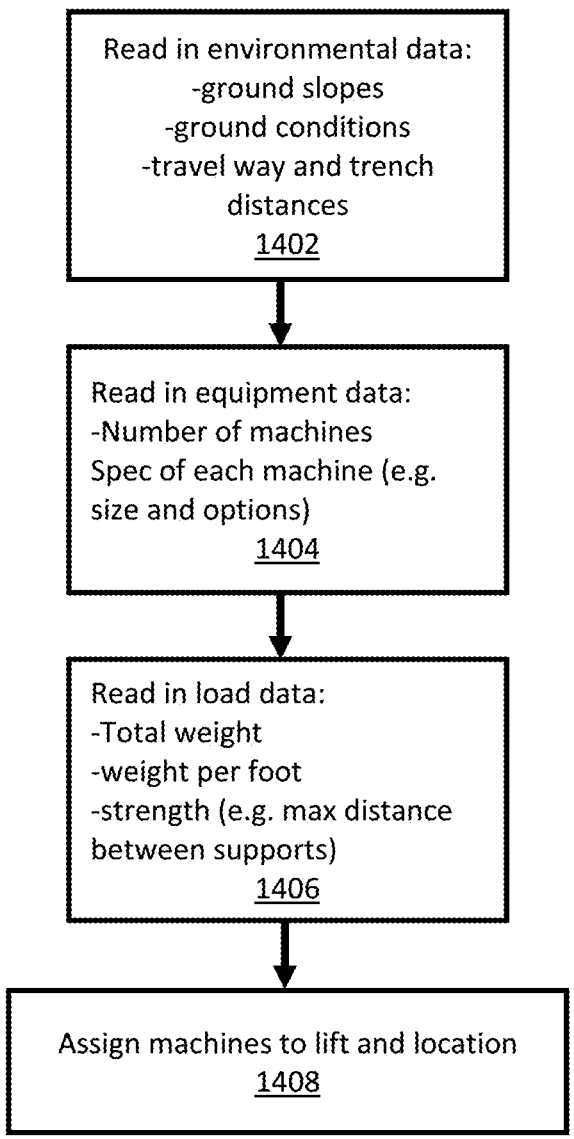

Turning now to FIG. 13, there is provided a process 1400 for lift planning. The lift monitoring system 1312 may read environmental data at step 1402. The environmental data may comprise ground slopes, ground conditions, travel way, and/or trench distances. The environmental data may be obtained from surveying data stored in a database of the full 3-dimensional nature of the work site. The lift monitoring system 1312 may then receive equipment data at step 1404. The equipment data may comprise the number of available pipe layer machines 1100 and/or a specification for each of the pipe layer machines 1100 and/or hoist lifting systems 100 (e.g. size, lift capacity, options, etc.). Each different size of pipe layer machine 1100 may have characteristics of maximum loads and distances from the first tipping fulcrum and front/rear tipping fulcrum, further dependent on the length of the boom 108 that may be installed. The tipping fulcrums may also be dependent on which sets of optional equipment, such as counterweight assemblies, mechanic platforms, winches, toolboxes, etc. that are installed on the pipe layer 1100. These factors may determine the load chart for each pipe layer machine 1100, further adjusted for any compound ground slopes each pipe layer machine 1100 would be operating on. Collectively, these specifications and options may comprise the load-distance relationship for each machine 1100 located on the ground conditions and trench distance at every given position along the load path. The lift monitoring system 1312 may then read in the load characteristics at step 1406, such as the total weight, weight per foot, strength (e.g. maximum allowable distance between supports). Once the lift monitoring system 1312 has received or read in all of the project data (e.g. environmental data, equipment data, and load characteristics), each pipe layer machine 1100 may be assigned to an initial location and/or a path of travel at step 1408.

Once the lift planning process 1400 has been completed, the assignment plan may be transmitted to the processing structure 1302 of each pipe layer machine 1100 and displayed to the operator on a display (not shown). The lift monitoring system 1312 may then begin a monitoring process 1500. The lift monitoring system 1312 may receive environmental data over its transceiver 1310 from one or more of the processing structures 1302 of each pipe layer machine 1100 at step 1502. Each processing structure 1302 may periodically update the lift monitoring system 1312 with updated environmental data over the course of the lift. The lift monitoring system 1312 may also receive equipment data from the processing structure 1302 at step 1504. The equipment data may comprise a current ground slope, position of the boom 108, location, present tipping factor, load lifted, and/or any failure states. Similarly, the equipment data may be periodically updated by each processing structure 1302 and transmitted to the lift monitoring system 1312. The lift monitoring system 1312 may display the lift data on the display 1316 where the lift supervisor may monitor the conditions, along with suggestions regarding safety and possible corrective actions.

Periodically, the lift monitoring system 1312 may perform calculations to determine error conditions, warnings, and/or suggest corrections to the lift supervisor (as described above) and/or operators at step 1508. These errors, warnings, and/or suggested corrections may be displayed on the display 1316 for the lift supervisor. In some aspects, the errors, warnings, and/or suggested corrections may be transmitted from the lift monitoring system 1312 using its transceiver 1310 to one or more of the processing structures 1302 of the pipe layer machines 1100 for display to the operator.

In some aspects, one or more override commands may be determined by the lift monitoring system 1312 and transmitted to the processing structures 1302 of the pipe layer machines 1100. The override commands may control the pipe layer machines 1100 to prevent overloads or instability at step 1510. These commands may include alterations to the relative position of the pipe layer machines 1100, increasing or decreasing gaps between pipe layer machines 1100, lifting or lowering booms 108, lifting or lowering the load to transfer more or less load to each machine 1100. These commands may also lock out an ability of the operator to perform some actions if doing so compromises safety, and/or may pass control over to the lift supervisor and have the lift supervisor remotely operate (and override the operator of) one or more piece of equipment.

For synchronized events, such as the final laydown of the pipe (or other load), the lift monitoring system 1312 may determine when each of the pipe layer machines 1100 has reached the appropriate location for laydown. The lift monitoring system 1312 may then send a laydown command to the processing structure 1302 of each pipe layer machine 1100 at step 1512. The laydown command may comprise a minimum and/or target laydown time, a maximum laydown velocity, a trench distance from the travel way, a laydown sequence (e.g. Machine A to touch ground first, then Machine B, then C, etc.).

In some aspects, the lift monitoring system 1312 may comprise a mobile device, such as a tablet, smartphone, heads-up display, virtual-reality headset, or augmented-reality glasses, where the supervisor may receive control and status data.

Although some aspects herein describe an example particularly related to pipe layer machines 1100, the aspects may equally apply to other types of machinery such as fixed and/or mobile cranes, dragline booms, shipboard cranes, elevator hoists, product skips, overhead cranes, etc.

Although some aspects herein measure the rope 120 length and/or speed using the lift winch encoder 106, the rope 120 length and/or speed may be measured using a contact-wheel placed on the rope 120 where it exits the winch drum 104 or any location along the rope 120, or other similar methods.

In some aspects, the methods described herein may, to some extent, function using calculated data to determine simulated data and life predictions in the absence of direct measurements of the load in each individual bearing face. In some aspects, the individual sheave loading measurements may be provided by sensors such as a plurality of conventional single-channel load pins, sheave bore button load cells, sheave support plate strain gauges, or other sensors providing similar data.

According to any or all aspects, any data from the measurements and/or the calculations may be saved to a long term storage device. The measurement and/or calculation data may be cross-referenced against an electronic log of physical/visual inspections and may provide load/usage data to underpin the results of the physical/visual inspections. This type of data logging system may assist in building an understanding of the causes of premature failures.

The aspect describe herein are considered as illustrative only. The aspects may be combined in any and all combinations as would be understood by one of skill in the art. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method of monitoring an operational life of at least one component in a hoist lifting system lifting a load, comprising:
   winding or unwinding a hoist cable, the hoist cable passing through a first set of sheaves within a first block and supported by a first sheave set axle;
   lifting or lowering a second block by winding or unwinding the hoist cable, the hoist cable formed into a plurality of lift ropes between the first set of sheaves and a second set of sheaves, the second set of sheaves supported by a second sheave set axle;
   receiving, by the processing structure, at least one sheave rotation measurement from at least one of: the first set of sheaves and the second set of sheaves;
   measuring a first load force on the first sheave set axle;
   determining, by the processing structure, a first incoming tension and a first outgoing tension for at least one sheave within the first set of sheaves based on the first load force and a sheave radius;
   determining, by the processing structure, a first frictional coefficient for a bearing associated with the first incoming tension and the first outgoing tension;
   comparing, by the processing structure, the first frictional coefficient to a range associated with a wear of the at least one component; and
   determining, by a processing structure, the wear of the at least one component.

2. The method according to claim 1, wherein the wear is selected from a bearing wear, a rope wear, and both the bearing wear and the rope wear.

3. The method according to claim 1, further comprising calculating a prediction of a remaining life of the at least one component.

4. The method according to claim 1, wherein determining, by the processing structure, the wear is based on the at least one sheave rotation measurement.

5. The method according to claim 1, wherein the at least one sheave rotation measurement is selected from a sheave rotation distance, a sheave rotation rate, and a combination of the sheave rotation distance and the sheave rotation rate.

6. The method according to claim 1, further comprising recording, by the processing structure to a tangible computer-readable medium, the first frictional coefficient into a maintenance database when the frictional characteristic lies outside of the range associated with the wear of the at least one component.

7. The method according to claim 1, further comprising displaying, on an operator display, a maintenance message when the first frictional coefficient lies outside of the range associated with the wear of the at least one component.

8. The method according to claim 1, further comprising limiting, by the processing structure, an operation of a lift winch when the first frictional coefficient lies outside of the range associated with the wear of the at least one component.

9. The method according to claim 8, wherein the operation comprises holding the hoist cable at a fixed length using the lift winch.

10. The method according to claim 8, further comprising measuring a second load force on the second sheave set axle.

11. The method according to claim 10, further comprising determining, by the processing structure, a second incoming tension and a second outgoing tension for at least one sheave within the second set of sheaves based on the second load force and a sheave radius.

12. The method according to claim 11, further comprising determining, by the processing structure, a second frictional coefficient for the bearing associated with the second incoming tension and the second outgoing tension.

13. The method according to claim 12, further comprising comparing, by the processing structure, the second frictional coefficient to the range associated with the wear of the at least one component.

14. The method according to claim 13, further comprising recording, by the processing structure to the tangible computer-readable medium, the second frictional characteristic into a maintenance database when the second frictional coefficient lies outside of the range associated with the wear of the at least one component.

15. The method according to claim 13, further comprising displaying a second maintenance message on the operator display when the second frictional coefficient lies outside of the range associated with the wear of the at least one component.

16. The method according to claim 13, further comprising limiting, by the processing structure, the operation of the lift winch when the second frictional coefficient lies outside of the range associated with the wear of the at least one component.

17. The method according to claim 16, wherein the operation comprises holding the hoist cable at a fixed length using the lift winch.

18. The method according to claim 1, further comprising calculating, by the processing structure, a load force estimate on the second sheave set axle based on the at least one sheave rotation measurement and the first load force.

19. The method according to claim 18, further comprising determining, by the processing structure, an incoming tension and an outgoing tension for the at least one sheave within the second set of sheaves based on the load force estimate and a sheave radius.

20. The method according to claim 19, further comprising determining, by the processing structure, a frictional coefficient for a bearing associated with the incoming tension and the outgoing tension.

21. The method according to claim 20, further comprising comparing, by the processing structure, the frictional coefficient to the range associated with the wear of the at least one component.

22. The method according to claim 21, further comprising recording, by the processing structure to the tangible computer-readable medium, the second frictional coefficient into the maintenance database when the frictional coefficient lies outside of the range associated with the wear of the at least one component.

23. The method according to claim 21, further comprising displaying, on an operator display, the maintenance message when the frictional coefficient lies outside of the range associated with the wear of the at least one component.

24. The method according to claim 21, further comprising limiting, by the processing structure, the operation of the lift winch when the frictional coefficient lies outside of the range associated with the wear of the at least one component.

25. The method according to claim 24, wherein the operation comprises holding the hoist cable at a fixed length using the lift winch.

26. The method according to claim 1, further comprising measuring, by a cable measurement sensor, a cable distance of the hoist cable being retracted or extended from the lift winch.

27. The method according to claim 26, further comprising determining, by the processing structure, the at least one component wear based on the cable distance measurements.

28. The method according to claim 27, further comprising determining, by the processing structure, at least one sheave rotation distance, at least one sheave rotation rate, or a combination of the at least one sheave rotation distance and the at least one sheave rotation rate based on the cable distance measurements.

29. The method according to claim 1, further comprising accounting, by the processing structure, for changes in the at least one component during operation of the hoist lifting system.

30. A method of monitoring an operational life of at least one component in a hoist lifting system lifting a load, comprising:
  winding or unwinding a hoist cable, the hoist cable passing through a first set of sheaves within a first block and supported by a first sheave set axle;
  lifting or lowering a second block by winding or unwinding the hoist cable, the hoist cable formed into a plurality of lift ropes between the first set of sheaves and a second set of sheaves, the second set of sheaves supported by a second sheave set axle;
  receiving, by the processing structure, at least one sheave rotation measurement from at least one of: the first set of sheaves and the second set of sheaves;
  measuring a load force on the first sheave set axle;
  determining, by the processing structure, an incoming tension and an outgoing tension for at least one sheave within the first set of sheaves based on the load force;
  determining, by the processing structure, a frictional coefficient for a bearing associated with the incoming tension and the outgoing tension and the at least one sheave rotation measurement;
  comparing, by the processing structure, the frictional coefficient to a range associated with a wear of the at least one component; and
  determining, by a processing structure, the wear of the at least one component.

31. A method of monitoring an operational life of at least one component in a hoist lifting system lifting a load, comprising:
  winding or unwinding a hoist cable, the hoist cable passing through a first set of sheaves within a first block and supported by a first sheave set axle;

lifting or lowering a second block by winding or unwinding the hoist cable, the hoist cable formed into a plurality of lift ropes between the first set of sheaves and a second set of sheaves, the second set of sheaves supported by a second sheave set axle;

receiving, by the processing structure, at least one sheave rotation measurement from at least one of: the first set of sheaves and the second set of sheaves;

measuring a load force on the second sheave set axle;

determining, by the processing structure, an incoming tension and an outgoing tension for at least one sheave within the second set of sheaves based on the load force;

determining, by the processing structure, a frictional coefficient for a bearing associated with the incoming tension and the outgoing tension and the at least one sheave rotation measurement;

comparing, by the processing structure, the frictional coefficient to a range associated with a wear of the at least one component; and determining, by a processing structure, the wear of the at least one component.

\* \* \* \* \*